US007003509B2

(12) United States Patent  (10) Patent No.: US 7,003,509 B2
Andreev  (45) Date of Patent: Feb. 21, 2006

(54) HIGH-DIMENSIONAL DATA CLUSTERING WITH THE USE OF HYBRID SIMILARITY MATRICES

(76) Inventor: Leonid Andreev, 24217 N. 87th St., Scottsdale, AZ (US) 85255

(*) Notice: Subject to any disclaimer, the term of this patent is extended or adjusted under 35 U.S.C. 154(b) by 254 days.

(21) Appl. No.: 10/622,542

(22) Filed: Jul. 21, 2003

(65) Prior Publication Data

US 2005/0021528 A1   Jan. 27, 2005

(51) Int. Cl.
  *G06F 17/30*   (2006.01)
(52) U.S. Cl. ........................................................ 707/2
(58) Field of Classification Search ............ 707/1–10, 707/100–104.1, 200–205; 716/1, 18; 715/721; 380/211; 725/116
  See application file for complete search history.

(56) References Cited

U.S. PATENT DOCUMENTS

| 5,519,608 | A | | 5/1996 | Kupiec |
| 5,598,344 | A | * | 1/1997 | Dangelo et al. ............... 716/18 |
| 5,765,166 | A | | 6/1998 | Gotfried et al. |
| 5,870,308 | A | * | 2/1999 | Dangelo et al. ............... 716/18 |
| 6,216,252 | B1 | * | 4/2001 | Dangelo et al. ............... 716/1 |
| 6,304,833 | B1 | | 10/2001 | Ferkinhoff et al. |
| 6,314,204 | B1 | | 11/2001 | Cham et al. |
| 6,581,048 | B1 | | 6/2003 | Werbos |
| 6,640,227 | B1 | | 10/2003 | Andreev |
| 2004/0103108 | A1 | * | 5/2004 | Andreev et al. ............ 707/100 |
| 2004/0205066 | A1 | * | 10/2004 | Bhattacharjee et al. ........ 707/8 |

OTHER PUBLICATIONS

Anderson, D. R., Burnhame, K. P., and Thompson, W. L. (2000) Null hypothesis testing: problems, prevalence, and an alternative. Journal of Wildlife Managemnet 64(4): 912-923.
Bellman, R. 1961. Adaptive Control Process: A Guided Tour. Princeton University Press.
Cunado, D., Nixon, M. S., and Carter, J. N. (2003) Automatic Extraction and Description of Human Gait Models for Recognition Purposes. Computer Vision and Image Understanding,.
Fisher, R. A., 1925. Statistical Methods for Research Workers. Oliver and Boyd. London.
Hallahan, Mark. The hazard of mechanical hypothesis testing. Psycoloquy, 1999, 10, #1 Social Bias 13.
Johnson, D. H. Hypothesis Testing: Statistics as Pseudoscience (5th Annual Conference of the Wildlife Society, Buffalo, NY, Sep. 26, 1998; publ. electron. on www.npwrc.usgs.
Kendall, M., and Stuart, H., 1979. The advanced theory of statistics. vol. 2. New York: Hafner.
Kolmogorov, A. N. 1965. Three approaches to the quantitative definition of information. Prob Inform. Transmission, 1, 4-7.

(Continued)

*Primary Examiner*—Diane Mizrahi

(57) ABSTRACT

This invention provides a method, apparatus and algorithm for compact description of objects in high-dimensional space of attributes for the purpose of cluster analysis by method of evolutionary transformation of similarity matrices. The proposed method comprises computation of monomeric similarity matrices based on each of parameters that describe a set of objects and the following hybridization of monomeric matrices into a hybrid similarity matrix, which allows for comparison of different attributes on a dimensionless basis. Individual monomeric matrices may be added to a hybrid matrix in any proportion, thus allowing for evaluation of significance of individual parameters. Two types of metrics are proposed for computation of monomeric matrices, depending on quantitative and qualitative nature of attributes used for description of objects under analysis.

8 Claims, 22 Drawing Sheets

Clustering of artificially generated 3D scatter plot of 50 points by ETSM-method, using hybrid matrix; monomeric matrices based on R-metric.

OTHER PUBLICATIONS

Landauer, R. 1961. Irreversibility and heat generation in the computing process. IBM Journal of Research and Development, vol. 5, No. 3.

Iarichev, Oleg I. Close imitation of expert knowledge: the problem and methods (Int. J. Inf. Technology and Decision Making, vol. 1, No. 1 (2002) 27-42.

* cited by examiner

FIG. 1B. Hierarchical clustering of 46 cities of 15 states of the U.S.A. based on 108 climatic parameters.

| | | | |
|---|---|---|---|
| 1.1.1. | MO, Kansas City | CA, San Diego | AL, Huntsville |
| NV, Las Vegas | 2.1.1.1.2.1. | 2.2.1.1.1.1.1. | 2.2.1.2.2.1 |
| 1.1.2. | VA, Lynchburg | GA, Augusta | TX, San Angelo |
| AZ, Phoenix | VA, Roanoke | GA, Macon | 2.2.1.2.2.2. |
| AZ, Yuma | 2.1.1.1.2.2. | 2.2.1.1.1.1.2. | TX, Dallas-Fort Worth |
| 1.2.1.1. | WV, Charleston | GA, Columbus | TX, Waco |
| NV, Elko | WV, Huntington | 2.2.1.1.1.2. | 2.2.2.1. |
| NV, Ely | 2.1.1.2.1. | GA, Savannah | FL, Apalachicola |
| 1.2.1.2. | OK, Oklahoma City | 2.2.1.1.2.1. | FL, Pensacola |
| NV, Winnemucca | OK, Tulsa | MS, Jackson | 2.2.2.2.1 |
| 1.2.2.1. | 2.1.1.2.2. | MS, Meridian | TX, Houston |
| CA, Bakersfield | TN, Knoxville | 2.2.1.1.2.2. | TX, Victoria |
| 1.2.2.2.1. | TN, Nashville | FL, Jacksonville | 2.2.2.2.2.1. |
| CA, Redding | 2.1.2.1. | FL, Tallahassee | LA, Baton Rouge |
| 1.2.2.2.2. | CA, Sacramento | 2.2.1.2.1.1. | LA, New Orleans |
| CA, Fresno | 2.1.2.2.1. | AR, Forth Smith | 2.2.2.2.2.2. |
| CA, Stockton | CA, Los Angeles | AR, Little Rock | LA, Lake Charles |
| 2.1.1.1.1. | 2.1.2.2.2. | 2.2.1.2.1.2. | |
| MO, Columbia | CA, Los Angeles AP | AL, Birmingham AP | |

FIG. 1A

FIG. 1B. Hierarchical clustering of 46 cities of 15 states of the U.S.A. based on 108 climatic parameters, using a hybrid matrix obtained by hybridization of 108 monomeric matrices.

| | | | |
|---|---|---|---|
| 1.1.1. | 2.1.2.1.1. | 2.2.1.1.2.1. | TX, Dallas-Fort Worth |
| NV, Elko | CA, Bakersfield | OK, Oklahoma City | TX, Waco |
| NV, Ely | CA, Redding | OK, Tulsa | 2.2.2.1. |
| 1.1.2. | 2.1.2.1.2.1. | 2.2.1.1.2.2. | FL, Jacksonville |
| NV, Winnemucca | CA, Fresno | AR, Fort Smith | FL, Tallahassee |
| 1.2.1. | 2.1.2.1.2.2. | AR, Little Rock | 2.2.2.2.1.1. |
| NV, Las Vegas | CA, Sacramento | 2.2.1.2.1.1.1. | LA, Baton Rouge |
| 1.2.2. | CA, Stockton | GA, Augusta | LA, New Orleans |
| AZ, Phoenix | 2.1.2.2.1. | GA, Macon | 2.2.2.2.1.2. |
| AZ, Yuma | CA, Los Angeles C.O. | 2.2.1.2.1.1.2. | LA, Lake Charles |
| 2.1.1.1. | 2.1.2.2.2. | GA, Columbus | 2.2.2.2.2.1. |
| MO, Columbia | CA, Los Angeles AP | 2.2.1.2.1.1.2 | FL, Apalachicola |
| MO, Kansas City | CA, San Diego | GA, Savannah | FL, Pensacola |
| 2.1.1.2.1. | 2.2.1.1.1.1. | 2.2.1.2.1.2. | 2.2.2.2.2.2. |
| VA, Lynchburg | TN, Knoxville | MS, Jackson | TX, Houston |
| VA, Roanoke | TN, Nashville | MS, Meridian | TX, Victoria |
| 2.1.1.2.2. | 2.2.1.1.1.2. | 2.2.1.2.2.1. | |
| WV, Charleston | AL, Birmingham AP | TX, San Angelo | |
| WV, Huntington | AL, Huntsville | 2.2.1.2.2.2. | |

FIG. 1B

FIG. 2A. Clustering of artificially generated 3D scatter plot of 50 points by ETSM-method.

FIG. 2B. Clustering of artificially generated 3D scatter plot of 50 points by ETSM-method, using hybrid matrix; monomeric matrices based on differences between distances.

FIG. 3A. Clustering of artificially generated 3D scatter plot of 50 points by ETSM-method, using hybrid matrix; monomeric matrices based on XR-metric, B-constant = 1.10.

FIG. 3B. Clustering of artificially generated 3D scatter plot of 50 points by ETSM-method, using hybrid matrix; monomeric matrices based on XR-metric; each value increased by 1000 units.

FIG. 3C. Clustering of artificially generated 3D scatter plot of 50 points by ETSM-method, using hybrid matrix; monomeric matrices based on R-metric.

FIG. 4A. Hierarchical clustering of 46 cities of 15 states of the U.S.A. based on 108 climatic parameters, using a hybrid matrix obtained by hybridization of 108 monomeric matrices based on XR-metric.

| | | | |
|---|---|---|---|
| 1.1.1. | CA, Los Angeles C.O. | GA, Augusta | AL, Birmingham Al |
| NV, Elko | 2.1.1.2.2. | GA, Macon | AL, Huntsville |
| NV, Ely | CA, Los Angeles AP | 2.2.1.1.2.1.1.2. | 2.2.2.1. |
| 1.1.2. | CA, San Diego | GA, Columbus | FL, Jacksonville |
| NV, Winnemucca | 2.1.2.1.1. | 2.2.1.1.2.1.2. | FL, Tallahassee |
| 1.2.1. | VA, Lynchburg | GA, Savannah | 2.2.2.2.1. |
| NV, Las Vegas | VA, Roanoke | 2.2.1.1.2.2. | FL, Apalachicola |
| 1.2.2. | 2.1.2.1.2. | MS, Jackson | FL, Pensacola |
| AZ, Phoenix | WV, Charleston | MS, Meridian | 2.2.2.2.2.1.1. |
| AZ, Yuma | WV, Huntington | 2.2.1.2.1.1. | LA, Baton Rouge |
| 2.1.1.1.1. | 2.1.2.2. | OK, Oklahoma City | LA, New Orleans |
| CA, Bakersfield | MO, Columbia | OK, Tulsa | 2.2.2.2.2.1.2. |
| CA, Redding | MO, Kansas City | 2.2.1.2.1.2. | LA, Lake Charles |
| 2.1.1.1.2.1. | 2.2.1.1.1.1. | AR, Fort Smith | 2.2.2.2.2.2. |
| CA, Fresno | TX, San Angelo | AR, Little Rock | TX, Houston |
| 2.1.1.1.2.2. | 2.2.1.1.1.2. | 2.2.1.2.2.1. | TX, Victoria |
| CA, Sacramento | TX, Dallas-Fort Worth | TN, Knoxville | |
| CA, Stockton | TX, Waco | TN, Nashville | |
| 2.1.1.2.1. | 2.2.1.1.2.1.1.1. | 2.2.1.2.2.2. | |

FIG. 4A

FIG. 4B. Hierarchical clustering of 46 cities of 15 states of the U.S.A. based on 24 humidity parameters.

| | | | |
|---|---|---|---|
| 1.1.1. | 1.2.2. | AR, Little Rock | 2.2.1.2.1.2. |
| NV, Las Vegas | CA, Los Angeles C.O. | TX, Dallas-Fort Worth | LA, Baton Rouge |
| 1.1.2. | 2.1. | 2.2.1.2.1.1.1.1.1.2 | LA, New Orleans |
| AZ, Phoenix | TX, San Angelo | TX, Waco | 2.2.1.2.2.1.1. |
| AZ, Yuma | VA, Roanoke | 2.2.1.2.1.1.1.1.2. | FL, Jacksonville |
| 1.2.1.1.1.1.1. | 2.2.1.1.1.1. | FL, Pensacola | FL, Tallahassee |
| NV, Winnemucca | VA, Lynchburg | 2.2.1.2.1.1.1.2.1. | 2.2.1.2.2.1.2. |
| 1.2.1.1.1.1.2. | 2.2.1.1.1.2.1. | WV, Huntington | FL, Apalachicola |
| NV, Elko | OK, Oklahoma City | 2.2.1.2.1.1.1.2.2. | 2.2.1.2.2.2.1. |
| NV, Ely | OK, Tulsa | MO, Columbia | TX, Houston |
| 1.2.1.1.1.2. | 2.2.1.1.1.2.2. | MO, Kansas City | TX, Victoria |
| CA, Bakersfield | WV, Charleston | 2.2.1.2.1.1.2.1. | 2.2.1.2.2.2.2.1. |
| 1.2.1.1.2. | 2.2.1.1.2.1. | AL, Birmingham AP | MS, Jackson |
| CA, Redding | GA, Augusta | TN, Nashville | MS, Meridian |
| 1.2.1.2.1. | GA, Savannah | 2.2.1.2.1.1.2.2.1. | 2.2.1.2.2.2.2.2 |
| CA, Fresno | 2.2.1.1.2.2. | AR, Fort Smith | LA, Lake Charles |
| 1.2.1.2.2. | GA, Columbus | TN, Knoxville | 2.2.2. |
| CA, Sacramento | GA, Macon | 2.2.1.2.1.1.2.2.2. | CA, Los Angeles AP |
| CA, Stockton | 2.2.1.2.1.1.1.1.1.1. | AL, Huntsville | CA, San Diego |

FIG. 4B

FIG. 4C. Hierarchical clustering of 46 cities of 15 states of the U.S.A. based on 36 temperature parameters.

| | | | |
|---|---|---|---|
| 1. | TN, Nashville | 2.2.1.1.2.1.2. | TX, Houston |
| NV, Elko | 2.2.1.1.1.1.2.1.1. | TX, Dallas-Fort Worth | 2.2.1.2.2.2.1.2. |
| NV, Ely | OK, Oklahoma City | 2.2.1.1.2.2.1. | FL, Jacksonville |
| 2.1.1.1. | OK, Tulsa | GA, Augusta | FL, Tallahassee |
| NV, Winnemucca | 2.2.1.1.1.1.2.1.2. | GA, Macon | 2.2.1.2.2.2.2.1. |
| 2.1.1.2.1. | AR, Fort Smith | 2.2.1.1.2.2.2.1. | LA, Lake Charles |
| MO, Columbia | 2.2.1.1.1.1.2.2.1. | TX, San Angelo | 2.2.1.2.2.2.2.2.1. |
| MO, Kansas City | AL, Huntsville | 2.2.1.1.2.2.2.2.1. | FL, Apalachicola |
| 2.1.1.2.2.1.1. | 2.2.1.1.1.1.2.2.2. | MS, Meridian | FL, Pensacola |
| WV, Huntington | AL, Birmingham AP | 2.2.1.1.2.2.2.2.2. | 2.2.1.2.2.2.2.2.2. |
| 2.1.1.2.2.1.2. | AR, Little Rock | GA, Columbus | LA, New Orleans |
| VA, Lynchburg | 2.2.1.1.1.2.1. | MS, Jackson | 2.2.2.1.1. |
| WV, Charleston | CA, Sacramento | 2.2.1.2.1. | CA, Los Angeles AP |
| 2.1.1.2.2.2. | CA, Stockton | NV, Las Vegas | CA, San Diego |
| VA, Roanoke | 2.2.1.1.1.2.2. | TX, Waco | 2.2.2.1.2. |
| 2.1.2. | CA, Redding | 2.2.1.2.2.1. | CA, Los Angeles C.O. |
| AZ, Yuma | 2.2.1.1.2.1.1. | GA, Savannah | 2.2.2.2. |
| 2.2.1.1.1.1. | CA, Bakersfield | 2.2.1.2.2.2.1.1. | AZ, Phoenix |
| TN, Knoxville | CA, Fresno | LA, Baton Rouge | TX, Victoria |

FIG. 4C

FIG. 4D. Hierarchical clustering of 46 cities of 15 states of the U.S.A. based on 36 cloudiness parameters.

| 1.1. | 2.1.2.1. | 2.2.1.2.2.2.1.2. | AR, Little Rock |
|---|---|---|---|
| NV, Winnemucca | TX, San Angelo | AR, Fort Smith | MS, Jackson |
| 1.2.1.1. | 2.1.2.2. | MO, Kansas City | 2.2.2.1.2.1. |
| CA, Redding | CA, Los Angeles AP | 2.2.1.2.2.2.2.1. | AL, Birmingham AP |
| 1.2.1.2.1. | CA, San Diego | TX, Dallas-Fort Worth | LA, Baton Rouge |
| CA, Sacramento | 2.2.1.1.1.1. | TX, Waco | LA, New Orleans |
| CA, Stockton | FL, Apalachicola | 2.2.1.2.2.2.2.2. | 2.2.2.1.2.2. |
| 1.2.1.2.2. | 2.2.1.1.1.2. | OK, Oklahoma City | LA, Lake Charles |
| CA, Bakersfield | FL, Jacksonville | 2.2.2.1.1.1.1.1.1. | 2.2.2.2.1.1.1. |
| CA, Fresno | FL, Tallahassee | TN, Knoxville | GA, Augusta |
| 1.2.2.1. | 2.2.1.1.2. | TN, Nashville | GA, Macon |
| CA, Los Angeles C.O. | TX, Houston | 2.2.2.1.1.1.1.1.2. | 2.2.2.2.1.1.2. |
| 1.2.2.1. | TX, Victoria | AL, Huntsville | GA, Savannah |
| AZ, Phoenix | 2.2.1.2.1. | 2.2.2.1.1.1.1.2. | 2.2.2.2.1.2. |
| NV, Las Vegas | MO, Columbia | MS, Meridian | VA, Lynchburg |
| 1.2.2.2.2. | NV, Elko | 2.2.2.1.1.1.2. | 2.2.2.2.2. |
| AZ, Yuma | 2.2.1.2.2.1. | VA, Roanoke | FL, Pensacola |
| 2.1.1. | NV, Ely | 2.2.2.1.1.2.1. | |
| WV, Charleston | 2.2.1.2.2.2.1.1. | GA, Columbus | |
| WV, Huntington | OK, Tulsa | 2.2.2.1.1.2.2. | |

FIG. 4D

FIG. 4E. Hierarchical clustering of 46 cities of 15 states of the U.S.A. based on 12 precipitation parameters.

| | | | |
|---|---|---|---|
| 1.1.1.1.1.1. | CA, Sacramento | WV, Huntington | FL, Apalachicola |
| AZ, Yuma | 1.1.2. | 2.1.2.1.2.1.1. | FL, Jacksonville |
| NV, Las Vegas | TX, San Angelo | GA, Augusta | 2.2.1.2.1.1. |
| 1.1.1.1.1.2. | 1.2. | GA, Macon | LA, Lake Charles |
| AZ, Phoenix | CA, Redding | 2.1.2.1.2.1.2. | 2.2.1.2.1.2. |
| CA, Bakersfield | 2.1.1.1. | TN, Knoxville | LA, Baton Rouge |
| 1.1.1.1.2.1. | TX, Dallas-Fort Worth | 2.1.2.1.2.2.1. | LA, New Orleans |
| NV, Elko | TX, Waco | MO, Columbia | 2.2.1.2.2. |
| NV, Winnemucca | 2.1.1.2.1. | 2.1.2.1.2.2.2.1. | FL, Pensacola |
| 1.1.1.1.2.2. | MO, Kansas City | AR, Fort Smith | FL, Tallahassee |
| NV, Ely | OK, Oklahoma City | TX, Houston | 2.2.2.1.1. |
| 1.1.1.2.1.1. | 2.1.1.2.2. | 2.1.2.1.2.2.2.2. | AL, Birmingham AP |
| CA, Fresno | OK, Tulsa | AR, Little Rock | 2.2.2.1.2. |
| CA, San Diego | TX, Victoria | TN, Nashville | MS, Jackson |
| 1.1.1.2.1.2. | 2.1.2.1.1.1. | 2.1.2.2. | MS, Meridian |
| CA, Los Angeles AP | VA, Lynchburg | GA, Savannah | 2.2.2.2. |
| CA, Stockton | VA, Roanoke | 2.2.1.1.1. | AL, Huntsville |
| 1.1.1.2.2. | 2.1.2.1.1.2. | GA, Columbus | |
| CA, Los Angeles C.O. | WV, Charleston | 2.2.1.1.2.2. | |

FIG. 4E

FIG. 5A. Clustering of 80 countries based on 51 demographic parameters and R-metric.

| | |
|---|---|
| 1.1.1.1.1.1. | Gibraltar, Luxemburg |
| 1.1.1.1.1.2. | Sweden |
| 1.1.1.1.2.1. | Austria |
| 1.1.1.1.2.2 | France, Switzerland, UK, Belgium, Denmark, Finland, Netherlands, Norway |
| 1.1.1.2.1. | Germany |
| 1.1.1.2.2.1. | Portugal |
| 1.1.1.2.2.2. | Greece, Italy, Spain |
| 1.1.2.1.1. | Montenegro |
| 1.1.2.1.2.1. | Belarus, Estonia, Latvia, Lithuania, Russia, Ukraine |
| 1.1.2.1.2.2. | Georgia, Bulgaria, Croatia, Czech Republic, Hungary, Poland, Romania, Serbia, Slovakia, Slovenia |
| 1.1.2.2.1. | Herzegovina |
| 1.1.2.2.2.1. | Macedonia |
| 1.1.2.2.2.2. | Armenia, Moldova |
| 1.2. | Israel |
| 2.1. | United Arab Emirates |
| 2.2.1.1. | Kuwait, Qatar |
| 2.2.1.2.1.1. | Bahrain, Brunei |
| 2.2.1.2.1.2. | Albania, Azerbaijan, Kazakhstan, Lebanon, Tunisia, Turkey |
| 2.2.1.2.2.1. | Bangladesh, Iran, Malaysia, Algeria, Egypt, Libya, Morocco |
| 2.2.1.2.2.2. | Indonesia, Kyrgyzstan, Pakistan, Tajikistan, Turkmenistan, Uzbekistan |
| 2.2.2.1.1.1. | Iraq, Jordan, Syria, West Bank |
| 2.2.2.1.1.2. | Gaza Strip |
| 2.2.2.1.2. | Oman, Saudi Arabia |
| 2.2.2.2.1.1. | Somalia, Yemen |
| 2.2.2.2.1.2. | Djibouti |
| 2.2.2.2.2.1. | Afghanistan, Eritrea |
| 2.2.2.2.2.2. | Ethiopia, Mauritania, Niger, Nigeria, Sudan |

FIG. 5A

Fig. 5B. Clustering of 80 countries based on 51 demographic parameters and XR-metric.

| | |
|---|---|
| 1.1.1.1.1. | Czech Republic |
| 1.1.1.1.2.1. | Denmark, Finland, France, Luxembourg, Netherlands, Norway, UK |
| 1.1.1.1.2.2. | Austria, Belgium, Germany, Gibraltar, Greece, Italy, Portugal, Slovenia, Spain, Sweden, Switzerland |
| 1.1.1.2.1.1. | Croatia, Hungary, Poland, Slovakia |
| 1.1.2.1.2. | Macedonia, Montenegro |
| 1.1.1.2.2. | Israel |
| 1.1.2.1.1.1. | Belarus, Bulgaria, Estonia, Latvia, Lithuania |
| 1.1.2.1.1.2. | Romania, Russia, Serbia, Ukraine |
| 1.1.2.1.2. | Bosnia & Herzegovina |
| 1.1.2.2.1. | Kuwait |
| 1.1.2.2.2.1. | Bahrain, Brunei, United Arab Emirates |
| 1.1.2.2.2.2. | Qatar |
| 1.2.1.1.1. | Jordan |
| 1.2.1.1.2.1. | Oman, West Bank |
| 1.2.1.1.2.2. | Gaza Strip |
| 1.2.1.2. | Georgia, Kazakhstan |
| 1.2.2.1.1. | Armenia, Moldova |
| 1.2.2.1.2.1. | Iran, Lebanon, Libya, Malaysia, Syria, Tunisia |
| 1.2.2.1.2.2. | Albania, Algeria, Indonesia, Morocco, Turkey |
| 1.2.2.2. | Egypt, Saudi Arabia |
| 2.1.1.1. | Iraq |
| 2.1.1.2.1.1. | Bangladesh, Turkmenistan, Uzbekistan |
| 2.1.1.2.1.2. | Kyrgyzstan |
| 2.1.1.2.2. | Azerbaijan, Pakistan |
| 2.1.2.1. | Sudan, Yemen |
| 2.1.2.2.1. | Mauritania, Nigeria |
| 2.1.2.2.2. | Eritrea |
| 2.2.1. | Djibouti, Tajikistan |
| 2.2.2.1.1. | Ethiopia |
| 2.2.2.1.2. | Niger, Somalia |
| 2.2.2.2. | Afghanistan |

FIG. 5B

FIG. 5C. Clustering of 80 countries based on 51 demographic parameters and differences in parameters for each monomeric matrix.

| | |
|---|---|
| 1.1.1.1. | Czech Republic, Slovenia |
| 1.1.1.2. | Sweden |
| 1.1.2.1.1.1. | Germany, Italy, Spain |
| 1.1.2.1.1.2. | Switzerland |
| 1.1.2.1.2. | Greece |
| 1.1.1.2.2. | Israel |
| 1.1.2.2.1.1. | Austria, Belgium, Finland |
| 1.1.2.2.1.2. | Denmark, Portugal, UK |
| 1.1.2.2.2.1. | France, Luxembourg, Netherlands |
| 1.1.2.2.2.1. | Bahrain, Brunei, United Arab Emirates |
| 1.1.2.2.2.2. | Gibraltar, Norway |
| 1.2.1.1.1.1. | Belarus, Bulgaria, Estonia, Latvia, Lithuania |
| 1.2.1.1.1.2. | Russia |
| 1.2.1.1.2.1. | Hungary, Ukraine |
| 1.2.1.1.2.2. | Romania, Serbia |
| 1.2.1.2.1.1. | Poland, Slovakia |
| 1.2.1.2.1.2. | Croatia, Macedonia, Montenegro |
| 1.2.1.2.2.1. | Israel |
| 1.2.1.2.2.2. | Armenia, Bosnia and Herzegovina |
| 1.2.2.1.1.1. | United Arab Emirates |
| 1.2.2.1.1.2. | Bahrain, Brunei |
| 1.2.2.1.2.1. | Kuwait |
| 1.2.2.1.2.2. | Jordan, Malaysia, Qatar |
| 1.2.2.2.1. | Iran, Tunisia |
| 1.2.2.2.2. | Lebanon |
| 2.1.1.1.1. | Moldova |
| 2.1.1.1.2.1. | Gaza Strip, Oman, West Bank |
| 2.1.1.1.2.2. | Libya, Syria |
| 2.1.1.2.1. | Algeria, Indonesia |
| 2.1.1.2.2.1. | Albania |
| 2.1.1.2.2.2. | Morocco, Turkey |
| 2.1.2.1.1.1. | Egypt, Iraq, Kazakhstan |
| 2.1.2.1.1.2. | Azerbaijan, Pakistan |
| 2.1.2.1.2.1. | Bangladesh, Turkmenistan, Uzbekistan |
| 2.1.2.1.2.2. | Kyrgyzstan |
| 2.1.2.2.1.1. | Georgia, Saudi Arabia |
| 2.1.2.2.1.2. | Tajikistan |
| 2.1.2.2.2.1. | Sudan, Yemen |
| 2.1.2.2.2.2. | Eritrea, Mauritania, Nigeria |
| 2.2.1. | Djibouti, Ethiopia |
| 2.2.2.1. | Niger, Somalia |
| 2.2.2.2. | Afghanistan |

FIG. 5C

FIG. 5D. Clustering of 80 countries based on 51 demographic parameters and Euclidean distances in 51-dimensional space

| | |
|---|---|
| 1.1.1. | Czech Republic, Slovenia |
| 1.1.2.1.1.1. | Germany, Italy, Spain, Switzerland |
| 1.1.2.1.1.2. | Greece |
| 1.1.2.1.2. | Sweden |
| 1.1.2.2.1.1. | Austria, Belgium, Finland |
| 1.1.2.2.1.2. | Denmark, Luxembourg, UK |
| 1.1.2.2.2.1. | Portugal |
| 1.1.2.2.2.2. | France, Gibraltar, Netherlands, Norway |
| 1.2.1.1.1.1. | Poland, Slovakia |
| 1.2.1.1.1.2. | Croatia, Hungary |
| 1.2.1.1.2. | Macedonia, Montenegro |
| 1.2.1.2.1.1. | Belarus, Latvia, Lithuania |
| 1.2.1.2.1.2. | Bulgaria, Estonia |
| 1.2.1.2.2.1. | Romania, Serbia |
| 1.2.1.2.2.2. | Russia |
| 1.2.2.1.1.1. | Bahrain, Brunei, Jordan, Kuwait, Malaysia, Qatar, United Arab Emirates |
| 1.2.2.1.1.2. | Bosnia and Herzegovina, Israel, Libya |
| 1.2.2.1.2.1. | Tunisia |
| 1.2.2.1.2.2. | Iran, Lebanon, Tunisia |
| 1.2.2.2. | Oman, West Bank |
| 2.1.1.1.1.1. | Armenia, Moldova |
| 2.1.1.1.1.2. | Albania, Algeria, Indonesia, Morocco, Turkey |
| 2.1.1.1.2.1. | Gaza Strip, Syria |
| 2.1.1.1.2.2. | Egypt, Georgia, Iraq, Kazakhstan, Saudi Arabia |
| 2.1.1.2.1. | Djibouti, Ethiopia |
| 2.1.1.2.2. | Tajikistan |
| 2.1.2.1.1.1. | Bangladesh, Turkmenistan, Uzbekistan |
| 2.1.2.1.1.2. | Kyrgyzstan |
| 2.1.2.1.2. | Azerbaijan, Pakistan |
| 2.1.2.2.1. | Sudan, Yemen |
| 2.1.2.2.2.1. | Mauritania, Nigeria |
| 2.2.1. | Niger, Somalia |
| 2.2.2. | Afghanistan |

FIG. 5D

FIG. 6A. Hierarchical clustering of 46 cities of 15 states of the U.S.A. based on 108 climatic parameters, using a hybrid matrix obtained by hybridization of 2 hybrid matrices, using R- and XR-metrics; B-constant = 1.10.

| | | | |
|---|---|---|---|
| 1.1.1.1. | CA, San Diego | MS, Meridian | 1.2.2.2.1.2. |
| MO, Columbia | 1.1.2.2.2. | 1.2.1.2.1.2.1. | FL, Pensacola |
| MO, Kansas City | CA, Los Angeles C.O. | GA, Augusta | 1.2.2.2.2.1. |
| 1.1.1.2.1. | 1.2.1.1.1.1. | 1.2.1.2.1.2.2. | FL, Apalachicola |
| WV, Charleston | TN, Knoxville | GA, Columbus | 1.2.2.2.2.2. |
| WV, Huntington | TN, Nashville | GA, Savannah | TX, Houston |
| 1.1.1.2.2. | 1.2.1.1.1.2. | 1.2.1.2.2.1. | TX, Victoria |
| VA, Lynchburg | AL, Birmingham AP | TX, San Angelo | 2.1.1. |
| VA, Roanoke | AL, Huntsville | 1.2.1.2.2.2. | NV, Elko |
| 1.1.2.1.1.1. | 1.2.1.1.2.1. | TX, Dallas-Fort Worth | NV, Ely |
| CA, Sacramento | OK, Oklahoma City | TX, Waco | 2.1.2. |
| CA, Stockton | OK, Tulsa | 1.2.2.1. | NV, Winnemucca |
| 1.1.2.1.1.2. | 1.2.1.1.2.2. | FL, Jacksonville | 2.2.1. |
| CA, Fresno | AR, Fort Smith | FL, Tallahassee | NV, Las Vegas |
| 1.1.2.1.2 | AR, Little Rock | 1.2.2.2.1.1.1. | 2.2.2. |
| CA, Bakersfield | 1.2.1.2.1.1.1. | LA, Baton Rouge | AZ, Phoenix |
| CA, Redding | GA, Macon | 1.2.2.2.1.1.2. | AZ, Yuma |
| 1.1.2.2.1. | 1.2.1.2.1.1.2. | LA, Lake Charles | |
| CA, Los Angeles AP | MS, Jackson | LA, New Orleans | |

FIG. 6A

FIG. 6B. Hierarchical clustering of 46 cities of 15 states of the U.S.A. based on 108 climatic parameters, using a hybrid matrix obtained by hybridization of 2 hybrid matrices, using R- and XR-metrics; B-constant = 1.15.

| | | | |
|---|---|---|---|
| 1.1.1.1. | CA, San Diego | MS, Meridian | 1.2.2.2.1.2. |
| MO, Columbia | 1.1.2.2.2. | 1.2.1.2.1.2.1. | FL, Pensacola |
| MO, Kansas City | CA, Los Angeles C.O. | GA, Augusta | 1.2.2.2.2.1. |
| 1.1.1.2.1. | 1.2.1.1.1.1. | 1.2.1.2.1.2.2. | FL, Apalachicola |
| WV, Charleston | TN, Knoxville | GA, Columbus | 1.2.2.2.2.2. |
| WV, Huntington | TN, Nashville | GA, Savannah | TX, Houston |
| 1.1.1.2.2. | 1.2.1.1.1.2. | 1.2.1.2.2.1. | TX, Victoria |
| VA, Lynchburg | AL, Birmingham AP | TX, San Angelo | 2.1.1. |
| VA, Roanoke | AL, Huntsville | 1.2.1.2.2.2. | NV, Elko |
| 1.1.2.1.1.1. | 1.2.1.1.2.1. | TX, Dallas-Fort Worth | NV, Ely |
| CA, Sacramento | OK, Oklahoma City | TX, Waco | 2.1.2. |
| CA, Stockton | OK, Tulsa | 1.2.2.1. | NV, Winnemucca |
| 1.1.2.1.1.2. | 1.2.1.1.2.2. | FL, Jacksonville | 2.2.1. |
| CA, Fresno | AR, Fort Smith | FL, Tallahassee | NV, Las Vegas |
| 1.1.2.1.2 | AR, Little Rock | 1.2.2.2.1.1.1. | 2.2.2. |
| CA, Bakersfield | 1.2.1.2.1.1.1. | LA, Baton Rouge | AZ, Phoenix |
| CA, Redding | GA, Macon | 1.2.2.2.1.1.2. | AZ, Yuma |
| 1.1.2.2.1. | 1.2.1.2.1.1.2. | LA, Lake Charles | |
| CA, Los Angeles AP | MS, Jackson | LA, New Orleans | |

FIG. 6B

FIG. 6C. Hierarchical clustering of 46 cities of 15 states of the U.S.A. based on 108 climatic parameters, using a hybrid matrix obtained by hybridization of 2 hybrid matrices, using R- and XR-metrics; with parameter multiplication.

| | | | |
|---|---|---|---|
| 1.1.1.1.1. | CA, Fresno | AR, Little Rock | TX, Victoria |
| WV, Charleston | 1.1.2.2.2. | 1.2.1.2.1.2.1.2. | 1.2.2.2.1.1. |
| WV, Huntington | CA, Bakersfield | MS, Jackson | LA, Baton Rouge |
| 1.1.1.1.2. | CA, Redding | MS, Meridian | LA, Lake Charles |
| VA, Lynchburg | 1.2.1.1.1.1. | 1.2.1.2.1.2.2. | 1.2.2.2.1.1.2 |
| VA, Roanoke | TN, Knoxville | GA, Savannah | LA, New Orleans |
| 1.1.1.2. | TN, Nashville | 1.2.1.2.2.1. | 1.2.2.2. |
| MO, Columbia | 1.2.1.1.1.2. | AR, Fort Smith | FL, Pensacola |
| MO, Kansas City | AL, Huntsville | OK, Tulsa | 2.1.1. |
| 1.1.2.1.1. | 1.2.1.1.2. | 1.2.1.2.2.2.1. | NV, Elko |
| CA, Los Angeles AP | OK, Oklahoma City | TX, San Angelo | NV, Ely |
| CA, San Diego | 1.2.1.2.1.1.1. | 1.2.1.2.2.2.2. | 2.1.2. |
| 1.1.2.1.2. | GA, Augusta | TX, Dallas-Fort Worth | NV, Winnemucca |
| CA, Los Angeles C. O. | GA, Macon | TX, Waco | 2.2.1. |
| 1.1.2.2.1.1. | 1.2.1.2.1.1.2. | 1.2.2.1.1.1. | NV, Las Vegas |
| CA, Sacramento | GA, Columbus | FL, Apalachicola | 2.2.2. |
| CA, Stockton | 1.2.1.2.1.2.1.1. | 1.2.2.1.1.2. | AZ, Phoenix |
| 1.1.2.2.1.2. | AL, Birmingham AP | TX, Houston | AZ, Yuma |

FIG. 6C

FIG. 7. Public opinion poll on gun control law

|  | "More strict" | "Less Strict" | "About right" |
|---|---|---|---|
| Republicans | 31 | 11 | 54 |
| Conservatives | 36 | 15 | 45 |
| Men | 41 | 12 | 44 |
| Independents | 54 | 7 | 34 |
| Moderates | 59 | 3 | 35 |
| Women | 64 | 4 | 28 |
| Democrats | 69 | 4 | 24 |
| Liberals | 69 | 4 | 23 |

FIG. 7

FIG. 8A. Clustering of data in FIG. 7 based on hybrid matrix, using R-metrics; one-cycle division by ETSM-method.

FIG. 8B. Clustering of data in FIG. 7 based on hybrid matrix, using R-metrics; one-cycle division by ETSM-method; with 3.6-multiplication of "less strict" parameter.

HIGH-DIMENSIONAL DATA CLUSTERING WITH THE USE OF HYBRID SIMILARITY MATRICES

CROSS-REFERENCE TO RELATED APPLICATIONS

The present invention is related to patent application Ser. No. 09/655,519 titled "Unsupervised automated hierarchical data clustering based on simulation of a similarity matrix evolution", by Andreev, now pending. This co-pending application is hereby incorporated by reference in its entirety into the present application.

STATEMENT REGARDING FEDERALLY SPONSORED RESEARCH OR DEVELOPMENT

Not Applicable

REFERENCE TO A MICROFICHE APPENDIX

Not Applicable
Current U.S. Class: 707/6; 707/7; 707/101; 707/102

BACKGROUND OF THE INVENTION

1. Field of the Inventnion

The present invention relates generally to the field of data processing and, more particularly, to a method and system for construction of similarity matrices for data sets in high-dimensional space of attributes with the purpose of data clustering on a dimensionless basis.

2. Description of the Related Art

Almost any computer application involves, to some extent, the use of some kind of procedure for establishing similarity-dissimilarity relationships. However, it is especially important in clustering, whose purpose is the grouping of data in accordance with proximities between data points. A large and constantly growing variety of academic disciplines and practical applications, in which clustering methods play a definitive role, call for increasing attention to the key component of such methods—the problem of adequate accuracy in establishing similarities and dissimilarities. In particular, an important yet not fully solved problem is represented by a situation when analyzed objects are characterized in high-dimensional data space but certain variables are not highly correlated. Searching for compact index representation of multi-dimensional raw data is a subject of numerous patents and other publications (cf., for example: Aggarwal, et al. U.S. Pat. No. 6,505,207; Aggarwal, et. al. U.S. Pat. No. 6,307,965 B1; Ravi, K. V., et al. Dimensionality reduction for similarity searching in dynamic databases. Proceedings of the ACM SIGMOID Conference. 1998; Ostrovsky E. U.S. Pat. No. 5,970,421; Martin, et. al. U.S. Pat. No. 6,260,038 B1; Boyack, et al. U.S. Pat. No.6, 389,418; Castelli, et al. U.S. Pat. No.6,122,628). Nevertheless, none of the existing approaches may be referred to as generally recognized and universal, and the heretofore proposed methods, as a rule, automatically lead to oversimplification and approximation, involve a multitude of stages and, therefore, are computationally expensive, and cannot be used in a fully automated unsupervised mode, which is an extremely important requirement to most of modern computer applications. Lately, it has also become clear that mathematical statistics methods, with all of their capabilities and versatility, can no longer be considered as the basis for development of routine technology for establishing similarities and dissimilarities in unsupervised mode. This is especially true for those cases when there is no a priori knowledge about the data structure.

Some of the approaches applied in many of the widely used applications for the purpose of establishing similarity-dissimilarity of objects described in high-dimensional space of attributes clearly represent a forced solution used for the lack of proper techniques and are simply nonsensical. For instance, there is a widely known notion of the "curse of dimensionality" which refers to a dramatic dependency of parameterization of distances between attributes on their dimensionality (Bellman, R. 1961. Adaptive Control Process: A Guided Tour. Princeton University Press. Cf also: Clarkson, K. An algorithm for approximate closest-point queries. In: Proceedings of the Tenth Annual ACM Symposium on Computational Geometry. 1994, pp. 160–164). Understandably, this dependency catastrophically increases in a super-space, resulting in a situation when the most that can be done about similarities-dissimilarities is the standardization of conditions for comparison of similarities on a presumption that "objects in a set have otherwise equal status", which by definition cannot be considered as an acceptable methodological platform.

Attributes that are used for description of sets of objects and constitute an important part of a data base are usually referred to as either categorical, or binary, or real numeric (continuous) data. This kind of typification may be rather important from the viewpoint of conventional data clustering techniques as some of them perform well when all of the data points of a data set contain the same type of attributes. In the meantime, in practice, by far more important distinctions between categories of attributes evaluation oftentimes evade the attention. For instance, in some systems, proportional changes in values of variables do not change the shapes of sets of points, or change them in such a way that the core system code remains unchanged, as, for example, in descriptions of a human shape in various positions. In such cases, metrics as Euclidean distances, or city block metric, etc. can be handily applied. However, comparison of incomes based on distances is never unambiguous: for example, the difference between annual incomes of $15,000 and $35,000 is the same as between $55,000 and $75,000, and from the viewpoint of, for instance, financing institutions, evaluation of a borrower's financial status (i.e. his financial "shape") based on his annual income is quite logical and acceptable; however, from the point of view of human logic and reality or, more precisely, from the viewpoint of financial survival power, the annual earning amounts of $15,000, $35,000, and $55,000–75,000 clearly represent three substantially different levels, which is so obvious that it does not require further explanation. In other words, the distance between the income of $15,000 and that of $35,000 from the viewpoint of "power" is by far greater that the difference between $55,000 and $75,000.

The use of distances may be illogical, for example, in establishing the dissimilarities between concentrations of fatty acids in bacterial membranes (Andreev et. al. In: The Staphylococci. J. Jeljaszewicz (Ed.) Gustav Fisher Verlag, New York, pp. 151–155, 1985), or between fractions of population pyramids which represent slowly changing pseudo-equilibrium systems even though they may often have a distinct, country-specific shape. There are plenty of other examples to the same effect. For instance, in climate studies, while mean temperature comparison based on distances obviously makes sense, data on relative humidity compared with the use of the Euclidean distances simply do not correlate with the known concepts about the physics of the atmosphere. Put simply, such things and shape and power cannot be evaluated based on same criteria.

The traditional approach to the establishing of similarities of objects in a high-dimensional space of attributes that are heterogenic according to their physical and physico-chemical nature takes its roots from the so-called numerical taxonomy dating back to the 60's of the past century. At that time, instrumented methods in physico-chemical analysis, such as chromatography and optical and mass-spectroscopy were being actively developed, and big progress was made in biochemical analysis and enzymatic testing of biological objects, particularly, microorganisms. Researchers in systematics and identification of microorganisms suddenly found themselves having access to huge databases, and that circumstance was the major factor that boosted the transformation of methods of numeric analysis into a widely recognized methodology, thus "promoting" biologists from the level of a descriptive science or almost humanities art to a level close to exact sciences. As a thorough study into the methodology of a proper use of each individual feature in multitudes of features that became available for the use in taxonomic research demanded serious efforts and was time-consuming, it is quite understandable, though unfortunate, that the principle of numerical taxonomy that allowed for fast and easy computerized utilization of a huge stream of information.

The concept of numerical taxonomy is simple and is based on establishing characters that are common for each of objects under comparison, on the one hand, and characters that are inherent only in one of the objects in a pair under comparison (cf e.g. Sneath, P. H. A., Sokal R. R. 1962. Numeric Taxonomy. Nature 193: 853–860; Sneath, P. H. A., Sokal, R. R. 1973. Numeric Taxonomy. W. F. Freeman and Company. San Francisco, Calif.). The above idea—without any regard to a type of mathematical formalization applied—is all what is put into the foundation of establishing similarity criteria in numerical taxonomy. Not only is the said approach naive, but the fact is that even a more naive idea is used for support that approach: using hundreds and thousands of attributes in a hope that by the end of the day something may emerge that should correlate with the "natural interrelationship" between organisms under study. This a priori unscientific idea of quantitative comparison between qualitatively different attributes has been accepted and approved by the research practice in numerical taxonomy.

Coming back to the clustering of objects in a high-dimensional space—the concept of applying Euclidean distances to a n-dimensional space has been a result of the influence of the above discussed principles of "taxonomy in bulk", being, in fact, a victory over common sense as it is obvious and clear that it is simply unscientific to try to determine proximities between object's features when they are expressed in different units of measurements. As an example, we will mention one of the commercially available computer programs for clustering, Clustan (Clustan Limited, UK), a guidebook to which contains an example of clustering of 25 species of mammals based on contents of ash, lactose, fat, protein, and water in the milk of respective mammals (Wishart, D. 1999. ClustanGraphics Primer: A Guide to Cluster Analysis. Edinburgh, Scotland). Even if the use of Euclidean distances between ash and water in the milk of mammals may accidentally (or not accidentally) result in clustering wherein objects are attributed in accordance with the currently accepted scientific views, common sense may not settle for such an approach, and the aforementioned example may not be used for verification of the validity of a given clustering technique.

The purpose of the present invention is development of a universal system for computation of similarity-dissimilarity to provide for efficient clustering of objects described in a high-dimensional data space. The proposed method most effectively works in cooperation with the invention specified in patent application Ser. No. 09/655,519 by Leonid Andreev, now pending. The above-referenced method for evolutionary transformation of similarity matrices (ETSM) has a number of features that make it related to the so-called "neural network" technology; however, ETSM has an important advantage over other clustering methods: by employing standard operations, it provides data systems with an opportunity for "self-expression" or self-evolution in accordance with their original complexity, resulting in hierarchical clustering wherein a number of clusters and interrelation between them is not determined by an operator or program developer but is revealed by a data system itself. That allows for highly accurate and independent verification of the techniques used for preparing the data for clustering and gives a feedback on whether or not a used technique is appropriate. Therefore, in the context of the present invention, we will discuss the basics of ETSM method.

The method for evolutionary transformation of similarity matrices consists in the processing, in one and the same fashion, of each cell of a similarity matrix so that a similarity coefficient between each pair of objects in a data set is replaced by a ratio of a similarity coefficient between each of object in a pair and the rest of the objects. The algorithm for such transformation is repetitively applied to a similarity matrix till each of similarities between objects within each of the clusters reaches 1 (or 100%) and no longer changes. In the end, the process of successive transformations results in convergent evolution of a similarity matrix. First, the least different objects are grouped into sub-clusters; then, major sub-clusters are merged as necessary, and, finally, all objects appear to be distributed among the two main sub-clusters, which automatically ends the process. Similarities between objects within each of the main sub-clusters equal 1 (or 100%), and similarities between objects of different sub-clusters equals a constant value which is less than 1 (or less than 100%). The entire process of transformation may occur in such a way that while similarities within one sub-cluster reach the value of 1 (or 100%) and stop transforming, another sub-cluster still continues undergoing the convergent changes and take a considerable number of transformations (in which the objects of another sub-cluster are no longer involved). Only after the convergent transformation of the second sub-cluster is complete, i.e. when similarities between its objects reach 1 (or 100%), and similarities between objects of the two sub-clusters clusters is less than 1 (or 100%), an entire process of evolutionary transformation of a similarity matrix is over. In the described process, there is no alternative to the sub-division of all objects of a data set into two distinctive sub-clusters. Any object that may represent a "noise points" for any of the major groups of objects in a data set of any degree of dimensionality gets allocated to one of sub-clusters.

Conversely, the above described convergent evolution may also be represented as divergent evolution and reflected in the form of a hierarchical tree. However, the mechanism of the algorithm for evolutionary transformation involves the most organic combination of the convergent and divergent evolution (or deduction and induction based on input information about objects under analysis). For that purpose, each of the sub-clusters formed upon completion of the first cycle of transformation is individually subjected to transformation, which results in their division into two further sub-clusters, respectively, as above described; then, each of the newly formed four sub-clusters undergoes a new transformation, and so on. This process, referred to as 'transformation-division-transformation' (or TDT) provides for the most rational combination of the convergent (transformation) and divergent (division) forms of the evolution process, in the result of which an entire database undergoes multiple processing through a number of processes going in opposite directions. The said combination of processes is not regulated and is fully automated and unsupervised; it depends on and is determined by only the properties of a target similarity matrix under analysis, i.e. by input data and an applied technique of computation of similarity-dissimilarity matrices.

In other words, the ETMS algorithm is based on uncompromising logic that cannot be manipulated by arbitrarily introduced commands, which results in the fact that the efficiency of the ETMS-method greatly depends on how adequate and scientifically well-grounded are the techniques used in presentation of input data (i.e. computation of similarity matrices). At the same time, such a sensitivity of the ETMS-method to the quality of input data makes it especially reliable as a criterion of suitability of methods for determination of similarities/dissimilarities.

BRIEF SUMMARY OF THE INVENTION

This invention provides a method, apparatus and algorithm for compact description of objects in a high-dimensional space of attributes for the purpose of cluster analysis by method of evolutionary transformation of similarity matrices (ETSM). In other words, the method of this invention allows for computation of similarity matrices of objects involving unlimited numbers of parameters in such a way which provides for fusion of parameters on the dimensionless basis and eliminates the negative effect of the "curse of dimensionality".

The essence of the method of this invention consists in replacement of a high-dimensional space of parameters, which is traditionally used for description of objects and the cluster analysis thereof, by a high-dimensional space of similarity matrices of objects, each of matrices corresponding to an individual parameter (hence, being a monomeric matrix). Then, monomeric matrices (whose number is no less than a number of parameters), which represent similarities between objects on a dimensionless basis, are fused into one similarity matrix by means of a procedure hereunder referred to as matrix hybridization. For the purpose of hybridization, all similarity coefficients in monomeric matrices for one and the same pair of objects are averaged through computation of their geometric (or arithmetic) means. Thus computed hybrid matrix covers all characters represented by individual parameters and is further used for cluster analysis by method for evolutionary transformation of similarity matrices (ETSM).

The way of computation of monomeric similarity matrices may have a significant effect upon the grouping of objects in a hybrid matrix, hence upon a cluster analysis result; and such an effect depends on what specifically is measured by a certain individual parameter. To ensure the most complete and harmonious fusion of monomeric similarity matrices (based on individual parameters) into a hybrid similarity matrix, the method of this invention involves the differentiation of various types of parameters (as well as variables, features, and attributes) into extensive (e.g. length, image shape, etc.) and intensive (e.g. concentration, current strength, brightness, etc.) ones. According to this invention, monomeric similarity matrices based on intensiveness parameters (i.e. parameters of power) are computed with the use of the so-called R-metric, which represents a ratio of a lower value of a parameter to its higher value; whereas monomeric matrices for extensiveness parameters (i.e. parameters of shape) are computed based on the XR-metric representing a ratio of a lesser value to a greater value of exponential functions, in which the base is a constant >1 and is equal for all parameters or for each given parameter, and the exponent is a value of a given parameter. These two metrics—XR and R—effectively and fully cover the entire diversity of possible types of parameters, and both of these similarity criteria vary within a natural range from 0 to 1 (from 0 to 100%). Below in this disclosure, it is demonstrated that upon combination of the method for evolutionary transformation of similarity matrices with the method for matrix hybridization, the XR-metric provides same results as the "city block" metric or Euclidean distances. However, unlike the two latter metrics, the XR-metric provides a similarity matrix, rather than a dissimilarity matrix.

Efficiency of the R- and XR-metrics coupled with matrix hybridization has been demonstrated on the examples that exclude the possibility of random coincidence of the results. For instance, one of the examples demonstrates the clustering of 80 states based on the data on 51 demographic parameters. The latter included various attributes, as different as, for instance, population pyramid sections, birth and death rates, life expectancy at birth, fertility factor, as well as dynamics of population growth in various years. As a result of cluster analysis, the 80 states have divided into three groups: (1) European countries with predominantly Christian populations; (2) Israel, with the predominantly Judaic population; and (3) all of the world countries with predominantly Muslim populations. The first group (with predominantly Christian populations) has further divided into two sub-groups: (a) countries with historically capitalist economy, and (b) countries of the former Soviet block. The obtained clustering results well agree with religious, political and economical peculiarities of the states under analysis, as well as with their geographical, cultural, historical and ethnological factors. Similarly, definite and clear-cut logic result was obtained in another example, demonstrating the clustering of 46 cities of 15 states of the U.S.A. based on the data on 108 meteorological parameters.

Matrix hybridization allows for application of various techniques used in multi-dimensional clustering based on the ETSM method. The description of such techniques is provided in the specification of the present invention, and their usability is provided by the method for hybridization of monomeric matrices. One of such techniques is the use of different metrics for different parameters upon computation of a final hybridized matrix. Such an approach provides for obtaining hybrid matrices that most adequately reflect properties of objects under analysis in a high-dimensional space of parameters of different nature, which is demonstrated below in the Detailed Description of the present invention.

Another technical approach proposed in the context of this invention is multiplication of individual monomeric matrices in a hybrid matrix. This is a flexible experimental tool that can be effectively used to regulate a statistical weight (contribution) of an individual parameter (i.e. to accentuate a parameter), or to evaluate a weight of a parameter (or a group of parameters) as compared to weights of other parameters involved in the description of features of objects under analysis. In conjunction with the matrix hybridization method, parameter multiplication, being in itself an increase of dimensionality, does not affect the clustering process in terms of complexity or computational cost.

All of the techniques contained in this invention are easy in realization and their computer implementation is done on a regular PC system. This does not imply, however, that their application is limited with simple problems only. A coherent methodology of parameter fusion offers great potentials in solution of complex problems, in particular, with the use of multi-processor technology, as most of similarity matrices involved in computation, as well as the evolutionary transformation thereof are of the same kind.

BRIEF DESCRIPTION OF THE DRAWINGS

The foregoing and other aspects and advantages of the present invention will be better understood from the following detailed description of the invention with reference to the drawings in which:

FIG. 1A illustrates clustering of 46 cities of 15 states of the U.S.A. characterized by 108 climatic parameters: morning and afternoon relative humidity (in per cent) based on multi-year records for each month of the year (total of 24 parameters), relative cloudiness (in per cent) based on multi-year average percentage of clear, partly cloudy and cloudy days per month (total of 38 parameters), normal daily mean, minimum and maximum temperatures in degrees of Fahrenheit (total of 36 parameters), as well as normal monthly precipitation in inches (total of 12 parameters) (data published by National Climatic data Center, http://lwf.ncdc.noaa.gov). The clustering was performed by method for evolutionary transformation of similarity matrices (ETMS). The dissimilarity matrix used for evolutionary transformation was computed based on Euclidean distances within the 108-parameter space.

FIG. 1B illustrates clustering of same objects as specified for FIG. 1A, however based on a hybrid matrix computed according to Formula 1 with the use of 108 monomeric similarity matrices corresponding to 108 individual parameters.

FIG. 4A illustrates the same as specified for FIG. 1B, however with the monomeric similarity matrices computed using the XR-metric (Formula 3, B-constant=1.50).

FIG. 4B illustrates the same as specified for FIG. 4A, however, instead of 108 meteorological parameters, only 24 parameters of humidity were used.

FIG. 4C illustrates the same as specified for FIG. 4A, however, instead of 108 meteorological parameters, only 36 parameters of average, minimal and maximal temperatures were used.

FIG. 4D illustrates the same as specified for FIG. 4A, however, instead of 108 meteorological parameters, only 36 parameters of cloudiness were used.

FIG. 4E illustrates the same as specified for FIG. 4A, however, instead of 108 meteorological parameters, only 12 parameters of precipitation were used.

FIG. 5A illustrates a hierarchical clustering, by the ETSM-method, of 80 countries described by 51 demographic parameters according to data for the year 2000 (U.S. Census Bureau, International Data Base, IDB Summary Demographic Data, by John Q. Public http://www.census.gov/ipc/www/idbsum.html). The countries include most of the European countries with predominantly Christian populations, Israel, and all of the world countries with predominantly Muslim population. 51 parameters include variables of population pyramid sections, birth and death rates, life expectancy at birth, fertility factor, as well as dynamics of population growth in various years. Clustering was done based on a hybrid matrix computed using the R-metric (Formula 2).

FIG. 5B illustrates the same as specified for FIG. 5A, however with the hybrid matrix computed using the XR-metric (Formula 3, B-constant=1.5).

FIG. 5C illustrates the same as specified for FIG. 5A, however with the hybrid matrix obtained by hybridization of monomeric similarity matrices based on differences between the parameters (city block metric).

FIG. 5D illustrates the same as specified for FIG. 5A, however with the hybrid matrix based on Euclidean distances in the 51-dimensional space.

FIG. 6A is an illustration of clustering obtained with the use of both R- and XR-metrics. Clustering of the same objects as in FIGS. 1A and 1B was done based on a matrix obtained by hybridization of two hybrid matrices. The first one was computed based on 36 parameters of relative humidity, using the R-metric. The second hybrid matrix was computed based on the rest 72 parameters (temperatures, precipitation, and cloudiness), using the XR-metric, at B=1.10.

FIG. 6B illustrates the same as specified for FIG. 6A, however with B=1.15.

FIG. 6C illustrates the same as specified for FIG. 6A, however with 5-fold multiplications of each of the variables of maximum temperatures in June, July, and August.

FIG. 7 is a table of data based on a public opinion poll: responses to question "What is your personal view on gun control laws? Generally speaking, do you think they ought to be more strict than they are now, or less strict, or do you think the laws we have now are about right?" (The Los Angeles Times National Poll, selected data from Study #443, Jul. 31, 2000, reproduced by courteous permission of Ms. Susan Pinkus, Director of The Los Angeles Times Poll).

DETAILED DESCRIPTION OF THE INVENTION

Figure 2A:
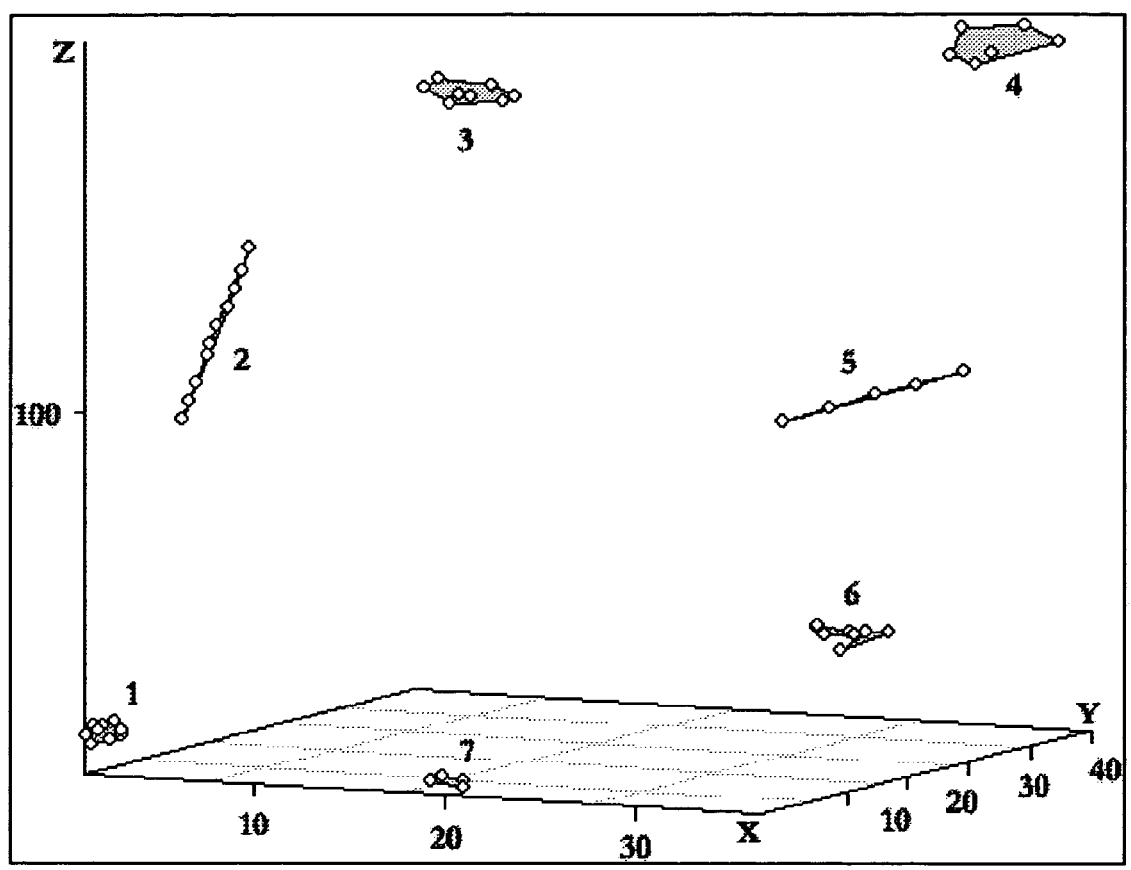
FIG. 2A illustrates clustering of 50 points of an artificially generated 3D scatter plot. Numbers 1 through 7 correspond to the 7 clusters. Clustering was performed by ETSM-method, with the use of a dissimilarity matrix computed based on Euclidean distances in a 3D-space.

The specification of the present invention consists of three consecutive and interrelated sections: (1) the method for hybridization of similarity matrices computed based on individual variables that provides for a compact description of high dimensionality and eliminates the possibility of response distortion which happens when values of attributes are described in different measurement units; (2) description of the metrics, developed as part of this invention, that ensure the most adequate reflection of specifics of attributes and thus make the application of hybridized matrices most efficient; and (3) description of techniques, developed as part of this invention, that ensure the optimal use of the aforementioned techniques and procedures.

The method and techniques proposed by this invention are designed for the use in combination with the method for evolutionary transformation of similarity matrices (ETSM) (the invention specified in patent application Ser. No. 09/655,519 by Leonid Andreev, now pending). A number of factors make this combination especially effective. Without providing a detailed analysis of all the advantages of the ESTM method (briefly discussed in the Description of the Related Art of the present invention), we will only point to its high additivity and scalability. In the course of analysis of a data set by the ESTM method, contributions of individual attributes into the totality of similarities between objects are displayed it in the form of certain increments whose relative weights remains constant throughout an entire procedure of hierarchical clustering.

Verification of results in high-dimensional clustering is an extremely complex task. Along with a number of purely technical solutions (such as those, for example, that are based on verification of accuracy of fulfillment of queries within large databases), the rightful approach, particularly when dealing with problems involving object classification, seems to be the one that is based on anthropomorphic approach. Indeed, any new method has at least one possible application in a field that has been a focus of thorough exploration by a scientific community and where a truth has been formulated if not in the form of a mathematical formula but at least as a series of verified observations perceived as an axiom. Based on the above considerations, in this disclosure, we have used, along with artificially generated sets of data, real world examples from demography and climate research so that the presented results, obtained in an unsupervised mode, can be easily evaluated from the point of view of their reasonableness.

1. Hybridization of Similarity Matrices.

The method for hybridization of similarity matrices, being the subject of the present invention, is based on the concept of conversion of attributes into a dimensionless state, hence removal of the "curse of dimensionality", so that values of attributes may be compared based on a perfectly clear methodological platform.

Assume that there is a table of data on m-number of objects described by n number of variable (parameters). A conventional way of calculation of a dissimilarity matrix would consist in establishing Euclidean distances between objects in an n-dimensional space of parameters. The method proposed by this invention comprises the calculation of the n-number of similarity/dissimilarity matrices for each parameter (the so-called "monomeric similarity matrices") of the m-number of objects and the following hybridization of the obtained matrices. According to this invention, the distances that are calculated and taken into account are not between various attributes of each of the objects but between the objects as described by each one of the parameters.

If we have a set of monomeric similarity or dissimilarity matrices where each of the matrices is calculated based on one of the parameters, i.e.

$$M(a), a \in \{1, 2, \ldots, n\}$$

then, according to this invention, hybridization of the matrices is performed by the formula $$Hij = \left(\prod_{a=1}^{n} M(a)_{ij}\right)^{1/n}, \quad (1a)$$

or by the formula $$Hij = \left(\sum_{a=1}^{n} M(a)_{ij}\right) \cdot n^{-1}, \quad (1b)$$

where Hij is a value of hybrid similarity or dissimilarity between objects i and j. It should be noted that in combination of the ETSM-method Formula 1a is more efficient that Formula 1b.

Thus, hybridization of matrices leads to the natural fusion of object patterns in terms of their variables' values. Clearly, hybridization can be done on similarity matrices that have been computed based on any type of attributes (categorical, binary, or numerical). Since attributes converted into units of a similarity-dissimilarity matrix no longer have any dimensionality, the above referred procedure for hybridization of similarity matrices can be used as a methodological basis for comparison of attributes of any kind and nature.

The example given below is based on a real world data set pertaining to climate studies and it demonstrates how the method of the proposed invention works in practice. The data set includes the following 108 climatic characteristics of 46 cities of 15 states of the U.S.A.(all data are based on multi-year records through 2000): morning and afternoon values of relative humidity, in per cent, for each month of the year (the total of 24 parameters), relative cloudiness, in per cent, based on multi-year average percentage of clear, partly cloudy and cloudy days per month (the total of 36 parameters), normal daily mean, minimum, and maximum temperatures in degrees of Fahrenheit (the total of 36 parameters), as well as normal monthly precipitation, in inches (the total of 12 parameters). The comparative climatic data are available from National Climatic Data Center: http://lwf.ncdc.noaa.gov. FIG. 1A illustrates the hierarchical clustering performed by evolutionary transformation of a dissimilarity matrix based on Euclidean distances within the 108-parameter space of the aforementioned data set. FIG. 1B shows the results of clustering performed on a hybrid dissimilarity matrix computed according to the method and Formula 1a of the present invention, i.e. involving hybridization of the 108 monomeric matrices that were calculated based on distances between the values of individual parameters (city block metric).

Unlike a regular "non-hybridized" matrix, a hybrid matrix, as early as at its first division by ETSM-method, isolates the cities of the states of Nevada and Arizona (both belonging to the arid zone) from all others. This logical move "made" by the hybrid matrix is explained by the absence of the negative effect of the curse of dimensionality: each of the meteorological features for each city is compared individually, and there are no absurdities like matching degrees of Fahrenheit to per cent of relative humidity. The cities of California, for example, fall into different clusters in case of a non-hybridized matrix, whereas the clustering of a hybrid matrix brings them all into one cluster with further appropriate subclustering.

It should be logical to conclude that when all the parameters in a system of data points are expressed in same units, clustering results should be identical in both cases—be it a hybridized or non-hybridized similarity matrix. The following example demonstrates that the above assumption is true.

Figure 2B:
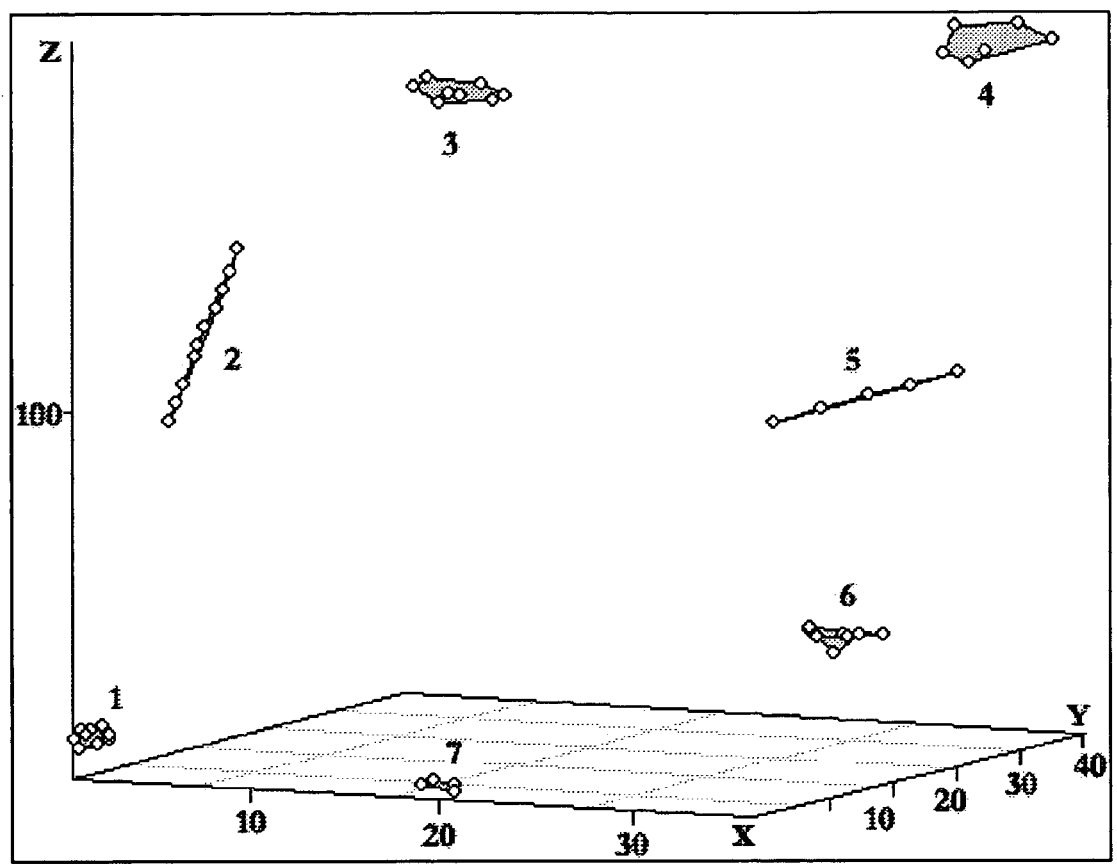
FIG. 2B illustrates clustering of same objects as specified for FIG. 2A, however based on a hybrid matrix obtained from three monomeric similarity matrices computed, respectively, for X, Y, and Z coordinates, using differences between values of parameters for each of two objects under comparison.

FIGS. 2A and 2B are illustrations of clustering, obtained by the ETSM-method, of artificially generated 3D scatter plots of 50 points consisting of 7 groups of points, two of which (groups 2 and 5) are represented by the lines of 10 and 5 points, respectively. On both figures, the clusters obtained by evolutionary transformation at a fixed number of nodes=3 are shown as shaded areas. As is seen upon comparison of FIGS. 2A and 2B, the clustering results obtained from the dissimilarity matrix based on Euclidean distances in a 3D space and from hybridization of three matrices based on distances in the X-, Y-, and Z-coordinates are practically identical. Some minor differences are observed only in the cluster shown as No. 6. This example proves that in this particular case of processing of meteorological data the differences in the clustering results obtained by the use hybridized and non-hybridized matrices have been solely due to the fact that it is incorrect to compare values of variables that are expressed in different units, which, however, is the way it is done in traditional methods for computation of dissimilarity matrices.

2. Metrics for Hybridization of Matrices

Hybridization of similarity matrices (monomeric matrices) provides a possibility to compare objects by using series of singular individual characters of objects. This leads to two different situations that determine a result of evaluation of similarities, as illustrated in the following example. Assume that there are three objects A, B, and C that are described by a variable V values, 1, 2 and 3, respectively. This simple case may be interpreted in two ways. One may conclude that A is located at a same distance from B as the distance between B and C. Another way of interpreting the above information will be to state that object A has a value of V twice lower than that of object B and three times lower than that of object C. Assume that V represents a distance in inches—in this case, if the first of the two ways of interpretation applied, the addition of 100 inches to each of the values will not change anything in the positional relationship between objects A, B, and C; the only effect will be a parallel transfer of the ABC system to 100 inches.

Now assume that V is illumination of the objects. If we add 100 units to each V value, it will appear that objects C and B whose illumination was two and three times, respectively, higher than that of object A, now has become almost equal to that of object A. This simple example demonstrates that there should be at least two types of metrics—for Shape and Power, respectively—and that metrics should be adequately chosen so that they are appropriate for a physical meaning of a given attribute.

Taking into account the foregoing, in the present invention, we propose two types of metrics that efficiently work for all cases of application of the proposed technique for hybrid matrices.

The first metric proposed by this invention is hereunder referred to as R-metric ("R" for "ratio") and is calculated by the formula:

$$R_{ij} = \min(V_i, V_j)/\max(V_i, V_j) \qquad (2),$$

where $V_i$ and $V_j$ are values of attribute V for objects i and j. Here, similarity values are calculated as the ratio of the lower value to the higher value of a parameter of each of the two objects. Thus, values of the R similarity coefficient vary from 0 to 1 (or 0 to 100%).

Another metric proposed by this invention is hereunder referred to as XR-metric ("XR" stands for "exponential ratio") and is calculated by the formula:

$$XR_{ij} = B^{-|V_i - V_j|} \qquad (3),$$

where $V_i$ and $V_j$ are values of attribute V for objects i and j, and B (which stands for "base") is a constant higher than 1. Values of the XR similarity coefficient also vary from 0 to 1 (or 0 to 100%).

R-metric is optimal for description truly or quasi-equilibrium systems where attributes reflect a signal strength, concentration, power, or other intensiveness characteristics. XP-metric is optimal for description of non-equilibrium systems where attributes reflect a system shape for operations in spatial databases, a distance between individual points within a system, or other extensiveness characteristics.

Figure 3A:
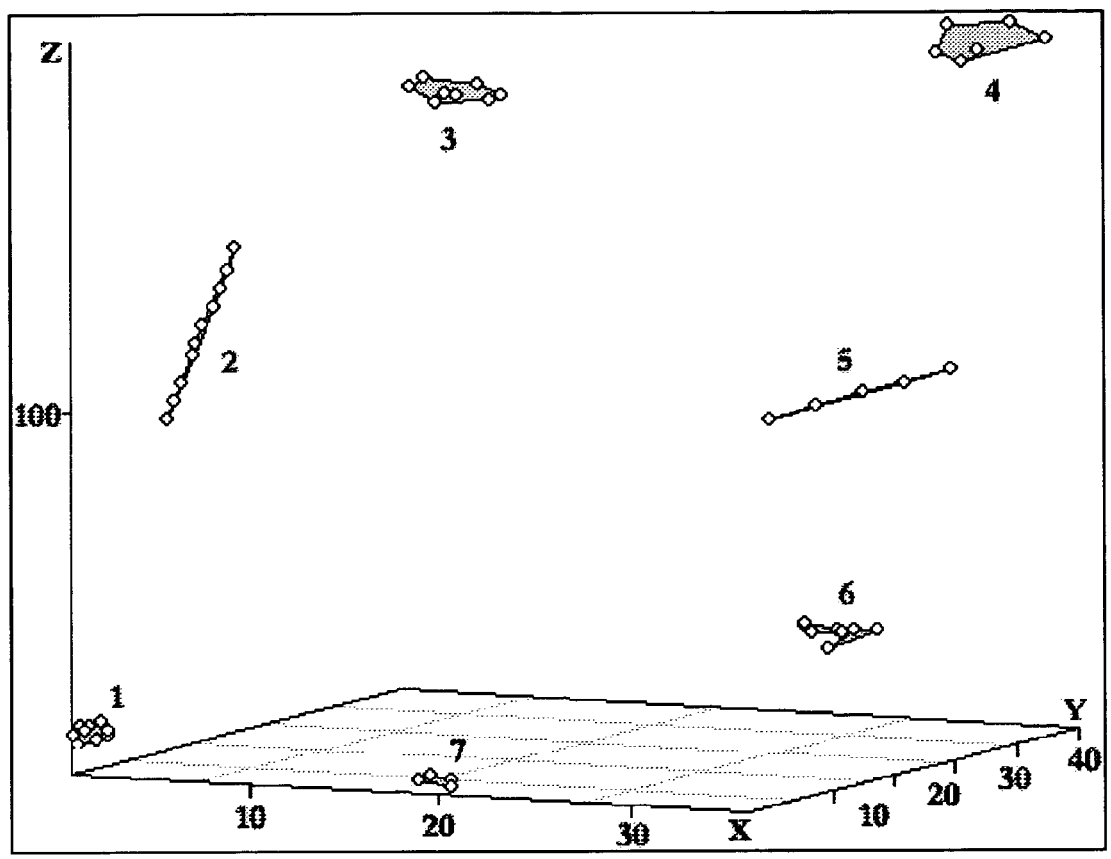
FIG. 3A illustrates clustering of same objects as specified for FIG. 2A and based on a hybrid matrix as specified for FIG. 2B, however with the use of the XR-metric (Formula 3, B-constant=1.10).
Figure 3B:
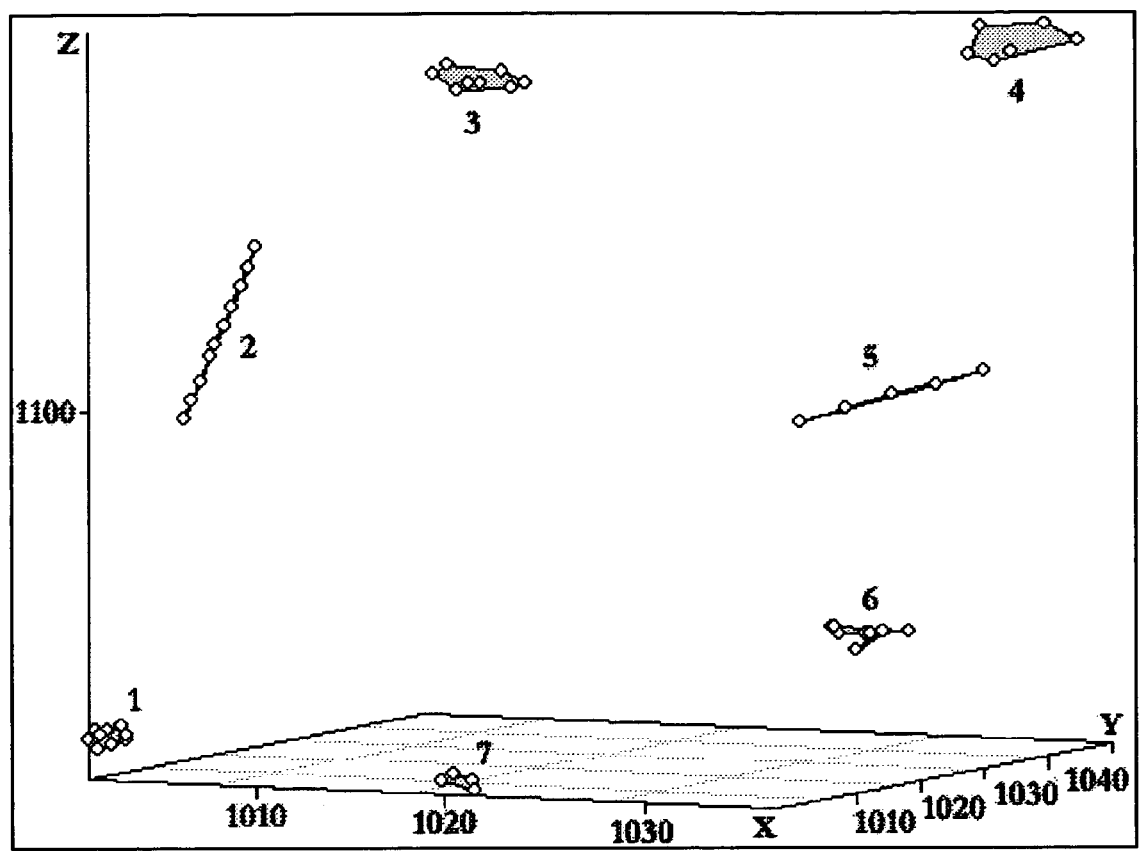
FIG. 3B illustrates the same as specified for FIG. 3A, however with each of the values of the three coordinates increased by 1000 units.
Figure 3C:
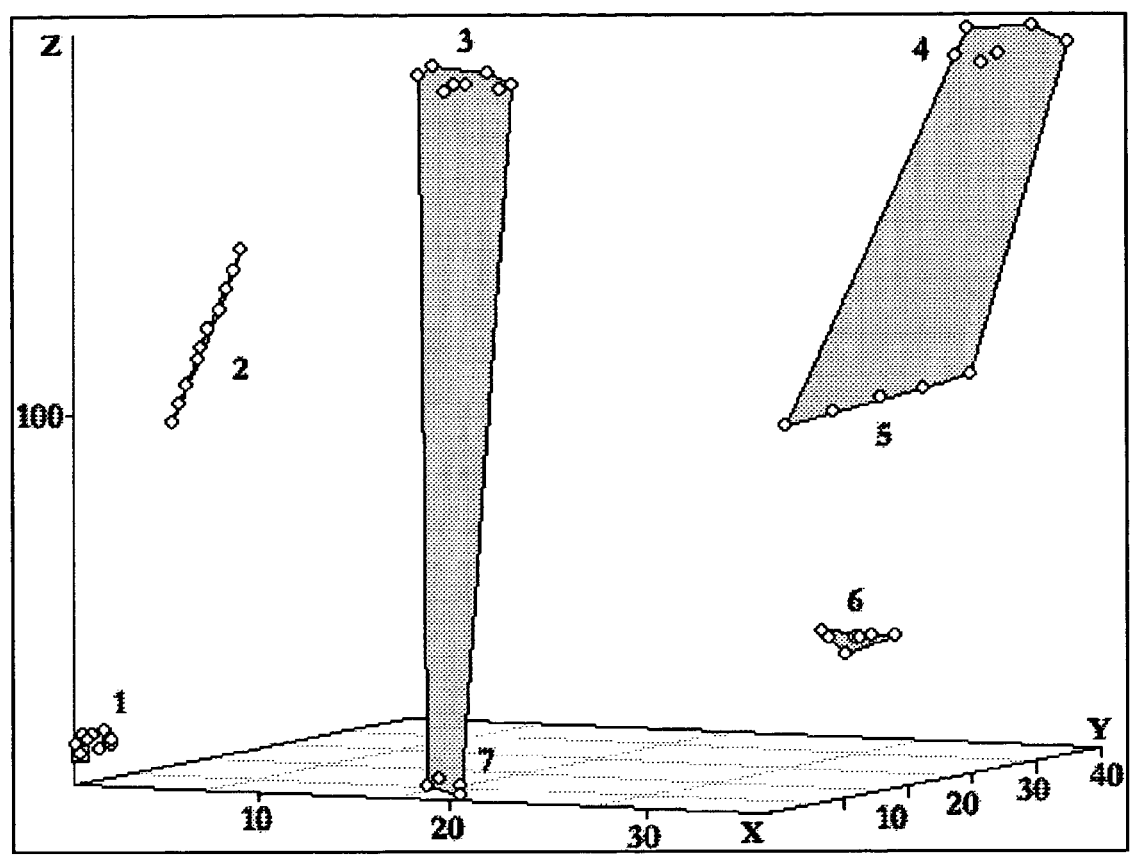
FIG. 3C illustrates the same as specified for FIG. 3A, however with the monomeric similarity matrices computed using the R-metric (Formula 2).

The use of the XR-metric, calculated by Formula 3 in combination with the ETSM method, provides results that are practically identical to those that are obtained with the use of Euclidean distances, which is demonstrated in FIGS. 3A and 3B below. FIG. 3A illustrates the clustering of the above-referenced (in FIGS. 2A and 2B) set of artificially generated scatter plot of 50 points. In this case, the clustering was done based on a hybrid matrix obtained from three similarity matrices: for variables X Y, and Z calculated with the use of the XR-metric according to Formula 3. The clustering results shown in FIG. 3A are practically a complete match of those shown in FIGS. 2A and 2B, with only slight differences in cluster No. 6. The fact that the XR-metric is (in combination with the ESTM method) a measurement of distance is clearly demonstrated in FIG. 3B that illustrates the case when each of the three parameters of the 50 points was increased by 1,000 units, which did not affect in any way the previous clustering result. This example demonstrates that the use of XR-metric for calculating a similarity matrix provides for an exceptionally high level scalability. As was pointed out above regarding the optimal areas of applications of the two metrics, it appears that the R-metric is much less efficient or even inefficient in clustering of scattered points. This is clearly demonstrated in FIG. 3C that shows the clustering results obtained with the use of the R-metric for computation of a hybrid similarity matrix.

FIG. 4A provides additional evidence in support of the fact that the XR-metric serves as a distance between dimensionless values. This figure illustrates the clustering of meteorological data with the use of the XR-metric and hybridization of the monomeric matrices. The presented result is very much the same as the one that was obtained based on distances in combination with hybridization of the monomeric matrices. The totality of the clustering results shown in FIGS. 4A–4E demonstrates the phenomenon of fusion of attributes in a "natural" way, based on dimensionless values. Clustering based on all 108 parameters shows that there is certain definite logic in the grouping of the cities—almost without exceptions, the cities are grouped so that: (a) cities of one state fall into one sub-cluster; (b) all the cities located in the arid zone fall into one group at the very first division; (c) neighbor states with similar climates fall into one sub-cluster, such as, for instance, VA and WV (sub-cluster 2.1.2.1), or FL and LA, as well as Houston, Tex. and Victoria, Tex.—both geographically close to LA (sub-cluster 2.2.2), or OK, AR, TN, AL (sub-cluster 2.2.1.2). In the meantime, the clustering performed based on each meteorological feature individually: humidity (FIG. 4B), cloudiness (FIG. 4C), temperature (FIG. 4D), and precipitation (FIG. 4E) completely lacks the afore-mentioned logic and regularities. These examples demonstrate that the method of the present invention—hybridization of similarity matrices—is an effective solution for clustering of datasets where individual parameters do not or poorly correlate with each other. It is also clear from the above examples that dimensionality reduction by selection of the most important parameters, hence by making object description means scantier, does not provide any advantages as compared to parameter fusion by means of hybridization of monomeric matrices.

Another example to illustrate the performance of the method of this invention is given below and demonstrates the clustering result based on 51 demographic variables for 80 countries, including various European countries (with predominantly Christian populations), Israel (with the predominantly Judaic population), and the countries of the world with predominantly Muslim populations (U.S. Census Bureau, International Data Base, IDB Summary Demographic Data, generated by John Q. Public, available at http://www.census.gov/ipc/www/idbsum.html). The table shown in FIG. 5A includes the year 2000 demographic data on 80 states. We used 51 parameters, of which 34 are shares of certain age groups of population, each group including a 4-year interval (0 to 4 years of age, 5 to 9, . . . up to 80+); 6 of the parameters represent: total fertility (rate per woman), infant deaths per 1,000 live births, life expectancy at birth (years), deaths per 1,000 population, birth per 1,000 population, and a ratio of a total number of men to a total number of women; and 11 parameters represented population numbers in 1980, 1990, and each of the years within the interval from 1991 through 1999 relative to those in 2000.

The table in FIG. 5A shows hierarchical clustering of the system of data on 80 states, based on 51 demographic parameters. The clustering was performed by the ETSM method, based on a hybrid similarity matrix obtained from 51 monomeric matrices, each computed for one of the 51 attributes, with the use of the R-metric. To facilitate the perception and interpretation of the results, the clustering was limited to 6 nodes.

The clustering results obtained in that case study point to a number of remarkable correlations between the groups of similarities obtained in a high-dimensional space of demographic parameters, on the one hand, and religious, political, economic, historical, and cultural similarities and dissimilarities between the peoples of the 80 states under analysis, on the other hand. The most important of those correlations are as follows:

1. The 80 states fall into three distinct groups that can clearly be defined as: (a) countries whose populations practice mainly Christianity (cluster 1.1); (b) Israel (mainly practicing Judaism) (cluster 1.2); and (c) countries whose populations practice mainly Islam (cluster 2.1).
2. The group of states whose populations practice mainly Christianity are clearly subdivided into two subgroups: (a) the states with capitalist economy, and (b) the states of the former Soviet block (republics of the former USSR and the states of the former socialist sector).
3. All Scandinavian countries (except for Sweden), Denmark, and The Netherlands—which have many features in common—fall into one group (1.1.1.1.2.2)
4. Russia, Ukraine, Belarus, as well as the three Baltic republics—all of them neighbor countries—appear to be in one group 1.1.2.1.2.1.
5. All European countries of the former socialist block (with the exception of a part of former Yugoslavia) fall into one group of clusters.
6. The territories with predominantly Palestinian population, such as West bank and Gaza Strip, as well as the neighboring countries, such as Iraq, Jordan, and Syria, fall into one group of clusters, 2.2.2.1.1.1.
7. Neighbor countries of Egypt, Algeria, and Morocco form one cluster, 2.2.1.2.2.1.
8. The Islamic republics of the former USSR—Kyrgyzstan, Tajikistan, Turkmenistan, and Uzbekistan—are in the same cluster as the neighboring Pakistan (2.2.1.2.2.2).
9. The Middle East oil-producing countries—United Arab Emirates, Kuwait, Qatar, and Bahrain (each of them having large percentage of male workers from foreign countries)—form one group of clusters (2.1–2.2.1.2.1.1).
10. All of the African states of the black race with predominantly Islamic populations form one cluster (2.2.2.2.2.2).

Thus, the obtained clustering of 80 objects performed by analysis of 51 parameters according to the ETSM-method demonstrates at least 10 points corroborating with commonly known facts.

A question may arise whether the above regularities could be a mere coincidence or have been present in the input data in such a form that their discovery did not require the applied method. To address this issue, it should be noted, first of all, that the 51 parameters very slightly correlate or do not correlate at all with each other in view of the regularities pointed out above. For instance, comparison of the data on the age group of 80+ for the countries with predominantly Christian populations clearly shows a difference between the capitalist and former socialist countries—a share of that age group in the capitalist countries is higher than in the former socialist countries. However, in the adjacent group of the age of 75–79, the above pattern is not observed, and the data are overlapping. Put simply, the input data in themselves do not suggest any obvious demographic correlations and do not allow for verification of the discovered regularities. Even in the hybrid similarity matrix computed with the use of the R-metric and sorted—but not subjected to evolutionary transformation—the capitalist and former socialist countries are fully overlapping.

We will now compare the above discussed clustering result obtained with the use of the R-metric for computation of the monomeric matrices with the clustering of the same data system but with the use of the XR-metric (see the table in FIG. 5B) with the clustering results based on the use of the city block metric coupled with matrix hybridization, as well as of Euclidean distances in an n-dimensional space (see the tables in FIGS. 5C and 5D)—i.e. the case when an analysis is based on shapes of population pyramids rather than on the power of individual demographic characteristics. It appears that in case of the use of the XR-metric, only two of the above discussed 10 regularities are revealed (No. 3 and 9). The use of Euclidean distances coupled with similarity matrix hybridization results in discovery of only one of the 10 regularities (No. 9). The use of a hybrid matrix obtained by hybridization of monomeric matrices based on the differences between the parameters (the city block metric) did not reveal any of the above noted regularities.

The above example is a pioneering demonstration of the demographic clustering that clearly and beyond doubt shows the correlation between a set of wide spectrum basic demographic characteristics of the states and denomination or—which is tantamount to it—a generalized sociopsychological profile of their populations, as well as the correlation between demographic peculiarities and political-economical status of the states. The number of states (80), as well as the number and diversity of the demographic parameters (51) involved in the discovered correlation provide a good evidence to the fact that the discovered correlation is not a mere coincidence and that the applied methodological and scientific approach is valid. The applied approach comprises three components. Its first component consists in the method for evolutionary transformation of similarity matrices (ETSM), fully unsupervised and providing unique conditions for "self-expression" of data sets. The second and third components of the above demonstrated approach represent the subject of this invention: hybridization of similarity matrices and the use of R-metric permitting to compare the power of qualitatively different parameters, such as, for instance, population growth dynamics to various sections of population pyramids by eliminating the "curse of dimensionality" and provide for the right organization of a similarity scale.

Techniques in Application of Hybrid Matrices

Hybridization of similarity matrices provides a number of new opportunities in data processing in general and in clustering technology in particular. One of them is associated with the use of different metrics in computation of monomeric matrices intended for hybridization. Individual approach to processing different attributes allows finding the most optimal way for processing data points in a high-dimensional space. We will demonstrate the potentials of this technique by using the example of the meteorological data set discussed above in reference to FIGS. 1A, 1B, and 4A. 24 of the 108 variables used in the meteorological data set pertain to relative humidity which is a typical intensiveness feature and, according to the ideology underlying the present invention, should be processed with the use of the R-metric. This is the case when different parameters (the group of 24, on the one hand, and the rest 84, on the other hand) require different approaches to their processing. However, there is an important factor to be taken into account. If all the parameters were processed based on the XR-metric as was the case in the example illustrated by FIG. 4A, then the value of B (base) in equation 3 for computation of similarities based on the XR-metric would practically have no effect on the result. For instance, in the above discussed meteorological dataset, the clustering result absolutely does not change when B changes within the range from 1.01 to 1.50. This is due to the fact that although similarity percentage values computed at different B values are different, they change proportionally in monomeric matrices. Besides, it is the peculiarity of the ETSM method that it objectively discovers an existing similarity infrastructure of a system of objects and provides same clustering result even when a given system is represented by an indefinite number of quantitatively different matrices However, if a similarity matrix is computed with the use of both the R- and XR- metrics, the B-constant becomes a variable that determines a contribution of XR-based monomeric matrices into a final hybrid matrix. This peculiarity of the B-constant is of high practical value as it helps to easily find, in complex data sets, object pairs whose similarities are invariant. This can be demonstrated by the above-referenced example of meteorological data. FIG. 6A and 6B are illustrations of hybrid-matrix clustering of U.S.A. cities based on 108 meteorological parameters. In both cases, the final hybrid matrices were obtained by hybridization of two hybrid matrices, one of which was computed based on 24 parameters of humidity (morning and evening values for each of the 12 months of the year) with the use of the R-metric, and another one included 84 parameters (cloudiness; mean, maximum and minimum temperatures; and precipitation) processed with the use of the XR-metric. In the first case (FIG. 6A), the value of B was 1.10; and in the second case (FIG. 6B), B had a value of 1.15. As is seen, the two clustering results differ from each other and from the result shown in FIG. 4A when all 108 parameters were processed with the use of the XR-metric. However, a comparison of all three clustering results points to the existence of certain invariant relationships between the objects of analysis. For instance, in all three results, the cities of Arizona and Nevada separate themselves from all other 40 cities as early as upon the first division. The cities of Louisiana, Virginia, West Virginia, and Missouri retain their groups in all three results. Same is true for the cities located in the area of the states of Tennessee, Alabama, Oklahoma, and Arkansas. Thus, invariant groups of similarities among objects under analysis, which is a crucially important part of data mining, can be established by using varied values of B-constant.

Another technique provided by the method of the present invention along with the combined use of the R- and XR-metrics is parameter multiplication. Traditional methods for computation of similarity matrices for objects in a high-dimensional space of attributes are aimed at elimination of excess or irrelevant parameters; however, the evaluation of parameter relevance is never a trivial task. With the use of similarity matrix hybridization coupled with the ETSM method, multiplication of individual parameters, i.e. increase of dimensionality, may have an important practical application.

Multiplication of individual variables in a high-dimensional space of attributes can be compared to a magnifier that allows a closer view of multiplied parameters. We will demonstrate it on the example of the above discussed meteorological data set. FIG. 6C shows a table of clusters obtained in the same way as the table in FIG. 6B except that each of the maximum temperature parameters for June, July and August were 5-fold multiplied. In other words, the initial number of 108 variables was increased by adding 12 more variables (3×4). As is seen upon comparison of the two clustering results (FIGS. 6B and 6C), parameter multiplication has caused a considerable amount of changes in the clustering structure, primarily resulting in re-positioning of the invariant groups. However, the most remarkable changes are those that occurred in regard to each of the cities of OK, AR and AL which after the parameter multiplication appeared to be in different sub-clusters. In this case, parameter multiplication lets to discover and emphasize the slight differences in temperatures (in the amount of tenths of degree of Fahrenheit) during the three warmest months of the year, keeping all other 105 parameters unchanged.

The parameter multiplication technique applied to clustering in high-dimensional space of parameters may give valuable insight in many ways. For instance, it makes it possible to emphasize individual parameters in multi-parameter queries, for example, to set emphasis on certain sections of patterns in biometric analyses, etc.

Parameter multiplication technique is also a valuable tool for establishing weights of individual parameters in a totality of numerous parameters. The example below, although simple in itself, clearly demonstrates that the proposed technique provides an effective solution in that area of application. The data shown in FIG. 7 are results of a public opinion poll (selected data from The Los Angeles Times National Poll Study #443, Jul. 31, 2000, published at: http://www.latimes.com, reproduced by courteous permission of Ms. Susan Pinkus, Director of The Los Angeles Times Poll) and represent responses to question "What is your personal view on gun control laws? Generally speaking, do you think they ought to be more strict than they are now, or less strict, or do you think the laws we have now are about right?" ("don't know" answers not included).

Figure 8A:
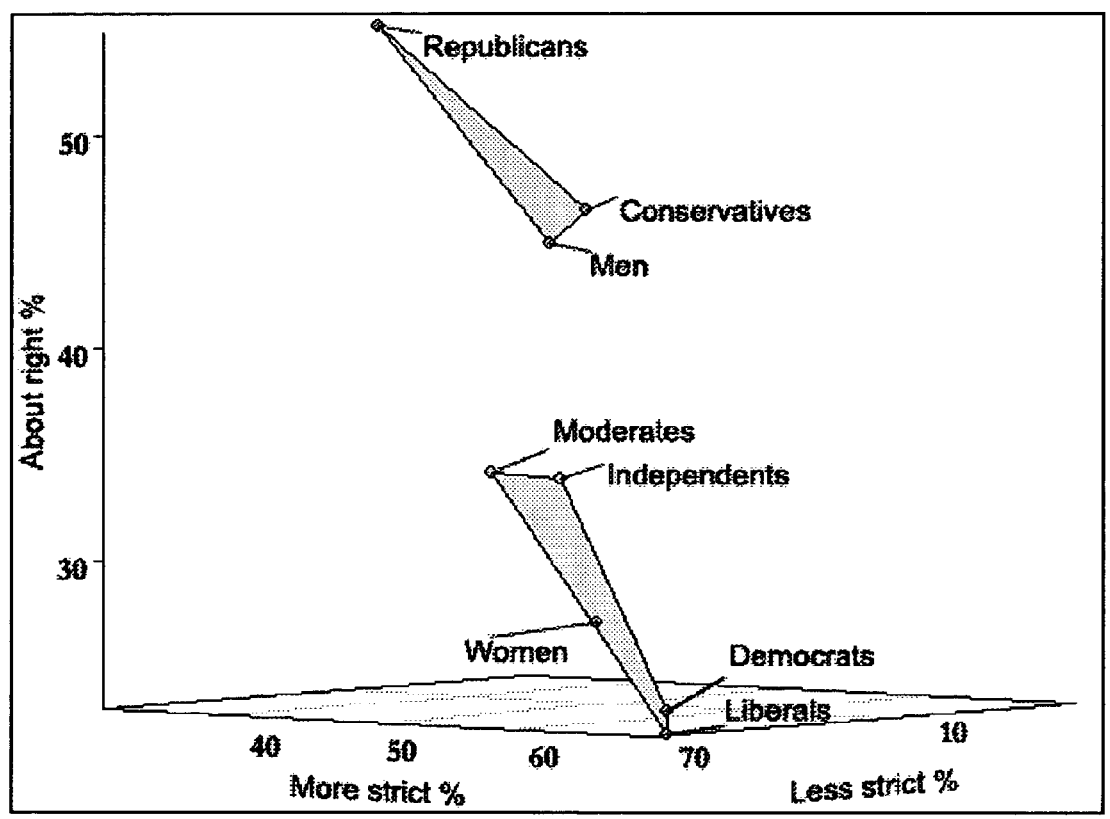
FIG. 8A illustrates the clustering based on the data shown in FIG. 7. Clustering was performed based on a hybrid matrix, using the R-metric. The matrix was subjected to one-cycle division by the ETSM-method.
Figure 8B:
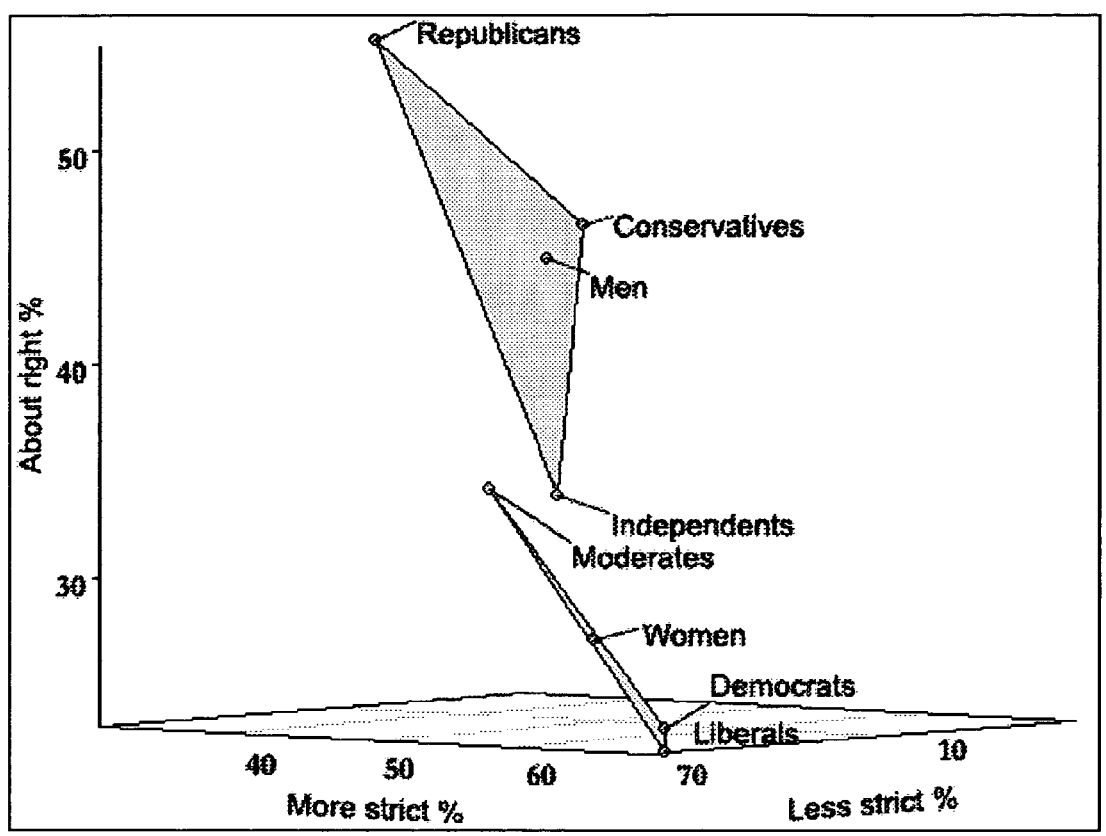
FIG. 8B illustrates the same as specified for FIG. 8A, however with the parameter "Less strict" multiplied 3.6 times.

FIG. 8A is an illustration of a 3D-diagram showing the grouping of similarities between the respondent groups after one-cycle transformation by the ETSM method (number of nodes=1; R-metric applied). It is apparent from the result shown in the diagram reflects the fact that the views on the gun law issues are consistent with the political traditions in the U.S.A.: Republicans, men, and conservatives belong to one cluster; and Democrats, Liberals, women, moderates, and independents belong to another cluster. Now let us see whether multiplication of each of the three parameters will change the overall clustering result. It appears that infinite multiplication of the percentages of the "More strict" and "About right" responses do not cause any changes in the pattern of attitudes of different groups of population to the gun law issues—i.e. the results on both of the responses are fully consistent and identical. As far as the "Less strict" response is concerned, the multiplication of this parameter, starting with 3.6-fold and up to an infinite number, resulted in a change in clustering and moved the independents from the group of Democrats, liberals, moderates, and women to the group of Republicans, men, and conservatives (see FIG. 8B). Thus, with the help of the multiplication technique we established that the "More strict" and "About right" responses are balanced and mutually complementary, and that the fine and non-obvious differences in the opinions of different groups of respondents lie in their positions on the issue of liberalization of the gun control law. The weight of the "Less strict" parameter is 3.6, whereas the weights of two other parameters equal 1. In more complex polls, weights of individual parameters (responses) may be of high practical importance for poll analysts.

The invention is preferably carried out with a general purpose computer comprising a CPU (central processing unit), RAM (random access memory), a video controller and an output device such as a monitor or a plotter.

While the present invention has been described herein in detail in connection with the preferred embodiments, the invention is not limited to such disclosed embodiments; rather it can be modified to incorporate any number of variations, alterations, or equivalent arrangements in accordance with the principles of the invention. All such embodiments and variations and modifications thereof are considered to be within the spirit and scope of the invention, as defined in the appended claims.

What is claimed is:

1. A computer-based method for computation of similarity matrices of objects in a high-dimensional space of attributes with the purpose of clustering, allowing for fusion of different attributes (parameters) on a dimensionless basis, comprising the steps of:
   a) computation of similarity matrices for each of attributes (parameters) individually, such matrices being monomer similarity matrices; and
   b) hybridization of all monomer similarity matrices into one hybrid matrix which is further used in clustering process.

2. The method of claim 1 wherein said hybridization of monomer similarity matrices is performed so that all similarity coefficients in monomer similarity matrices for one and the same pair of objects are averaged through computation of their geometric (arithmetic) means.

3. The method of claim 1 wherein each of monomer similarity matrices used in computation of a hybrid matrix is computed with the use of a metric that most optimally suits a respective attribute (parameter).

4. The method of claim 3 wherein a choice of metrics used in computation of monomer similarity matrices for further hybridization into a hybrid matrix depends on whether a respective attribute (parameter) describes a shape or power of an object.

5. The method of claim 4 wherein attributes (parameters) should be treated either as those describing a shape or as those describing a power, depending on a problem to be solved by clustering analysis.

6. The method of claim 4 wherein monomer similarity matrices based on attributes (parameters) describing shapes of objects are computed with the use of a metric representing a ratio of a lesser value to a greater value of exponential functions in which a base is a constant >1 and an exponent is a value of a respective parameter.

7. The method of claim 4 wherein monomer matrices based on attributes (parameters) describing power of objects are computed with the use of a metric representing a ratio of a lower value of a parameter to a higher value of the same parameter.

8. The method of claim 1 wherein each and any of said monomer matrices may be multiplied and added to a hybrid matrix in an indefinite number of extra copies.

* * * * *